US010770717B2

(12) United States Patent
Sato et al.

(10) Patent No.: US 10,770,717 B2
(45) Date of Patent: Sep. 8, 2020

(54) COMPOSITION FOR SECONDARY BATTERY NEGATIVE ELECTRODE AND NEGATIVE ELECTRODE FOR SECONDARY BATTERY USING THE SAME AND SECONDARY BATTERY

(71) Applicants: JNC CORPORATION, Tokyo (JP); JNC PETROCHEMICAL CORPORATION, Tokyo (JP)

(72) Inventors: Soichiro Sato, Chiba (JP); Yoshihito Takano, Chiba (JP); Hirotsuna Yamada, Chiba (JP); Keiichiro Kanao, Chiba (JP); Miwako Nishimura, Chiba (JP); Tetsuro Kizaki, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 82 days.

(21) Appl. No.: 16/232,085

(22) Filed: Dec. 26, 2018

(65) Prior Publication Data

US 2019/0207217 A1     Jul. 4, 2019

(30) Foreign Application Priority Data

Dec. 28, 2017 (JP) ................... 2017-254487

(51) Int. Cl.
*H01M 4/134* (2010.01)
*H01M 4/587* (2010.01)
(Continued)

(52) U.S. Cl.
CPC .......... *H01M 4/134* (2013.01); *H01M 4/133* (2013.01); *H01M 4/364* (2013.01); *H01M 4/366* (2013.01);
(Continued)

(58) Field of Classification Search
None
See application file for complete search history.

(56) References Cited

U.S. PATENT DOCUMENTS

2007/0281216 A1    12/2007  Petrat et al.
2015/0221936 A1*   8/2015  Huang ............... H01M 4/0402
                                            429/217
(Continued)

FOREIGN PATENT DOCUMENTS

JP    2007534118    11/2007
JP    2015046220    3/2015
(Continued)

*Primary Examiner* — Scott J. Chmielecki
(74) *Attorney, Agent, or Firm* — JCIPRNET

(57) ABSTRACT

A composition for a secondary battery negative electrode including a carbonaceous material (a) and a silicon oxide structure (b), wherein the silicon oxide structure (b) includes a silicon oxide framework containing Si and O in its atomic composition and silicon-based nanoparticles that are chemically bonded to the silicon oxide framework as components, wherein the silicon oxide structure (b) is contained in a proportion of 15 mass % or more with respect to a total amount of the carbonaceous material (a) and the silicon oxide structure (b), and wherein the silicon oxide structure (b) satisfies the following conditions (i) to (iii): (i) having an atomic composition represented by a general formula $SiO_{x2}H_{y2}$ ($0.3 < x2 < 1.5$, $0.01 < y2 < 0.35$), (ii) having Si—H bonds, and (iii) being essentially free of carbon.

20 Claims, 8 Drawing Sheets

(51) Int. Cl.
  *H01M 10/0525* (2010.01)
  *H01M 4/48* (2010.01)
  *H01M 4/133* (2010.01)
  *H01M 4/36* (2006.01)
  *H01M 4/38* (2006.01)
  *H01M 4/02* (2006.01)

(52) U.S. Cl.
  CPC ........... *H01M 4/386* (2013.01); *H01M 4/483* (2013.01); *H01M 4/587* (2013.01); *H01M 10/0525* (2013.01); *H01M 2004/027* (2013.01)

(56) References Cited

U.S. PATENT DOCUMENTS

| | | |
|---|---|---|
| 2016/0307809 A1* | 10/2016 | Andrieu .............. H01L 29/7846 |
| 2017/0012282 A1 | 1/2017 | Kondo et al. |
| 2017/0222212 A1 | 8/2017 | Hong et al. |
| 2018/0212228 A1* | 7/2018 | Iwatani ................. H01M 4/621 |
| 2019/0152787 A1* | 5/2019 | Takano .................. H01M 4/38 |

FOREIGN PATENT DOCUMENTS

| | | |
|---|---|---|
| JP | 2015088462 | 5/2015 |
| JP | 2016170930 | 9/2016 |
| JP | 2017107886 | 6/2017 |
| JP | 2017514290 | 6/2017 |
| WO | 2013099267 | 7/2013 |

\* cited by examiner

COMPOSITION FOR SECONDARY BATTERY NEGATIVE ELECTRODE AND NEGATIVE ELECTRODE FOR SECONDARY BATTERY USING THE SAME AND SECONDARY BATTERY

CROSS-REFERENCE TO RELATED APPLICATION

This application claims the priority of Japan patent application serial no. 2017-254487, filed on Dec. 28, 2017. The entirety of the above-mentioned patent application is hereby incorporated by reference herein and made a part of this specification.

BACKGROUND

Technical Field

The present invention relates to a negative electrode material composition for a secondary battery and a negative electrode for a secondary battery using the same, and a secondary battery. More specifically, the present invention relates to a negative electrode material composition for a secondary battery through which at least one battery characteristic from a battery capacity and a discharging rate characteristic can be improved and a negative electrode for a secondary battery using the same, and a secondary battery.

Description of Related Art

Secondary batteries are used as driving power sources in various electronic devices and communication devices and eco-vehicles such as hybrid vehicles. Regarding such secondary batteries, the development of various lithium ion batteries in which, mainly, a lithium intercalation compound that releases lithium ions from between layers is used for a positive electrode material and a carbonaceous material (for example, graphite) that can occlude and release (intercalate) lithium ions between crystal plane layers during charging and discharging is used for a negative electrode material has progressed and been put into practice.

In view of the above circumstances, in recent years, according to reduction in sizes of various electronic devices and communication devices, and rapid spreading of hybrid vehicles and the like, there has been strong demand for development of secondary batteries which have a larger capacity and various further improved battery characteristics such as cycle characteristics and discharging rate characteristics as driving power sources for such devices. In order to realize such high performance secondary batteries, there have been attempts to improve various characteristics, in particular, focusing on structures of a negative electrode material and a negative electrode. For example, the following technologies are known.

In Patent Literature 1, in addition to a positive electrode and a non-aqueous electrolyte, a non-aqueous electrolyte secondary battery including a negative electrode having a predetermined configuration is disclosed. More specifically, the negative electrode includes a negative electrode current collector and a negative electrode active material layer attached to a surface of the negative electrode current collector. The negative electrode active material layer includes a carbonaceous material that can occlude and release lithium ions and a silicon oxide represented by $SiO_x$ ($0.5<x<1.5$), and further includes a rich silicon oxide surface layer part and a rich carbonaceous material main layer. Thus, in the above surface layer part, a proportion of silicon oxide with respect to a total amount of the carbonaceous material and silicon oxide is 50 mass % or more, and in the negative electrode active material layer, an amount of lithium corresponding to at least a part of a negative electrode irreversible capacity is pre-doped. In Patent Literature 1, it is mentioned that such a configuration of the negative electrode has advantages such as that the negative electrode is unlikely to be deformed, side reactions according to charging and discharging cycles are minimized, and handling of the negative electrode when a battery is produced becomes easier.

In addition, Patent Literature 2 discloses an electrode which includes (a) at least one of carbon nanoparticles, metal particles, metal oxide particles, semimetal particles (for example, silicon particles), and semimetal oxide particles (for example, silicon oxide particles), (c) a surfactant, and (d) a binder, and in which, when cycling is performed at a charging and discharging rate of about 0.1 C, a specific capacity of an active material of at least 450 mAh/g can be obtained. According to the content disclosed in Patent Literature 2, in the above electrode, carbon nanoparticles are used as a carbonaceous material that occludes and releases lithium ions during charging and discharging, and in addition to the carbon nanoparticles, the predetermined inorganic particles, a surfactant and a binder are used as structural components. Thereby, uniform dispersion of the carbon nanoparticles in the electrode is realized, and as a result, it is possible to realize improvement in a capacity, performance and a lifespan of the battery.

In addition, Patent Literature 3 discloses an electrode material for a lithium ion battery including various components having predetermined properties at predetermined proportions. Specifically, this electrode material includes 5 to 85 mass % of silicon-based nanoparticles having a BET surface area of 5 to 700 m$^2$/g and an average primary particle diameter of 5 to 200 nm, 0 to 10 mass % of conductive carbon black, 5 to 80 mass % of graphite having an average particle diameter of 1 to 100 μm, and 5 to 25 mass % of a binder. It is described in Patent Literature 3 that when the electrode material having such a configuration is used, favorable cycle characteristics can thus be realized and a high capacity retention rate and mechanical stability can be maintained.

In addition, Patent Literature 4 discloses a non-aqueous negative electrode for a secondary battery including a current collector and a negative electrode active material layer attached to the current collector. The above negative electrode active material layer has a structure in which a plurality of six-membered rings composed of silicon atoms are connected and includes a first active material (i) containing nano-silicon produced by heating a layered polysilane represented by a compositional formula (SiH)n and a second active material (ii) containing graphite in a predetermined proportion. In Patent Literature 4, the first active material containing nano-silicon obtained by heating a layered polysilane under predetermined conditions is combined with the second active material containing graphite, and thus graphite functions as a buffer material, breakage of the negative electrode active material layer due to expansion and contraction of silicon during charging and discharging is prevented, and as a result, cycle characteristics can be improved.

In addition, Patent Literature 5 discloses a negative electrode active material. The negative electrode active material contains a powder mixture in which a first active material powder (a) composed of at least one selected from the group consisting of Si, Si compounds, Sn, and Sn compounds and a second active material powder (b) composed of plate-like graphite particles having a thickness of 0.3 nm to 100 nm, and a length in the longitudinal direction of 0.1 jam to 500 jam are mixed in predetermined proportions. It is described in Patent Literature 5 that, when a negative electrode active material having such a configuration is used, an initial capacity and initial efficiency can be improved and additionally, cycle characteristics can be improved.

In addition, Patent Literature 6 discloses a negative electrode active material layer which includes a first powder containing at least one selected from the group consisting of Si, Si compounds, Sn, and Sn compounds and a second powder containing plate-like graphite particles having a thickness of 0.3 nm to 100 nm and a length in the longitudinal direction of 0.1 µm to 100 µm in predetermined proportions, and in which an average particle diameter D50 of the second powder is smaller than an average particle diameter D50 of the first powder. Patent Literature 6 was filed by the same applicants as Patent Literature 5, and provides further improved technologies compared with Patent Literature 5 which is particularly intended to improve an initial capacity and initial efficiency.

[Patent Literature 1] Japanese Unexamined Patent Application Publication No. 2015-46220
[Patent Literature 2] Published Japanese Translation No. 2017-514290 of the PCT International Publication
[Patent Literature 3] Published Japanese Translation No. 2007-534118 of the PCT International Publication
[Patent Literature 4] Japanese Unexamined Patent Application Publication No. 2017-107886
[Patent Literature 5] Japanese Unexamined Patent Application Publication No. 2015-88462
[Patent Literature 6] Japanese Unexamined Patent Application Publication No. 2016-170930

SUMMARY

Incidentally, the inventors conducted research and development in order to provide a negative electrode active material which exhibits various types of battery performance in a more balanced manner than has been seen in negative electrode materials of the related art so far and which is highly practical, and as a result, developed a negative electrode active material having a sufficiently favorable balance for practical use and exhibiting favorable battery characteristics. The applicants have already filed patent applications for similar inventions (Japanese Patent Application No. 2016-129861 and Japanese Patent Application No. 2017-2953). Specifically, the technology described in the specification of Japanese Patent Application No. 2016-129861 is a technology in which a silicon-based nanoparticle-containing hydrogen polysilsesquioxane sintered product which is composed of silicon-based nanoparticles and in which silicon-based nanoparticles and a hydrogen polysilsesquioxane-derived silicon oxide structure are chemically bonded, which has SiH bonds and a predetermined atomic composition of silicon (Si)/oxygen (O)/hydrogen (H), and is essentially free of carbon is used as a negative electrode raw material. In addition, in the technology described in the specification of Japanese Patent Application No. 2017-2953, the above silicon nanoparticle-containing hydrogen polysilsesquioxane sintered product is additionally covered with a metal oxide, and thus high speed charging and discharging are realized, a large capacity is realized, and charging and discharging cycle characteristics, initial discharging efficiency and a capacity retention rate are improved.

The above silicon nanoparticle-containing hydrogen polysilsesquioxane sintered product developed by the inventors has a configuration substantially different from negative electrode active materials known so far in that it has Si—H bonds and a predetermined atomic composition of silicon (Si), oxygen (O) and hydrogen (H), and additionally contains silicon-based nanoparticles, and thus a hydrogen polysilsesquioxane-derived silicon oxide structure is chemically bonded to the surface of the silicon-based nanoparticles. When such a technical configuration is used for a negative electrode for a secondary battery, it is verified that a high level capacity which has never been obtained is exhibited and superior initial discharging efficiency and cycle characteristics are exhibited (the specification of the above patent application).

The inventors conducted extensive studies regarding practical application of a negative electrode material using the above hydrogen polysilsesquioxane sintered product and to further improve battery performance, and as result, found that, in a negative electrode composition including this silicon nanoparticle-containing hydrogen polysilsesquioxane sintered product and a carbonaceous material, when such components are contained in predetermined proportions, various battery characteristics are thus maintained in a well-balanced manner and at least one battery characteristic from a battery capacity and a discharging rate characteristic can be further improved.

The present invention has been realized based on such findings. That is, one aspect of the present disclosure provides a negative electrode material composition for a secondary battery through which at least one battery characteristic from a battery capacity and a discharging rate characteristic can be improved and a negative electrode for a secondary battery using the same, and a secondary battery. Here, it should be noted that the above problems are based on silicon nanoparticle-containing hydrogen polysilsesquioxane sintered product which is not publicly known, and the problem and solution of the present invention are novel.

According to an aspect of the present invention, the following composition for a secondary battery negative electrode is provided.

[1] A composition for a secondary battery negative electrode comprising:
a carbonaceous material (a); and
a silicon oxide structure (b),
wherein the silicon oxide structure (b) includes a silicon oxide framework containing Si and O in its atomic composition and silicon-based nanoparticles that are chemically bonded to the silicon oxide framework as components,
wherein the silicon oxide structure (b) is contained in a proportion of 15 mass % or more with respect to a total amount of the carbonaceous material (a) and the silicon oxide structure (b), and
wherein the silicon oxide structure (b) satisfies the following conditions (i) to (iii):
(i) having an atomic composition represented by a general formula $SiO_{x2}H_{y2}$ ($0.3<x2<1.5$, $0.01<y2<0.35$);
(ii) having Si—H bonds; and
(iii) being essentially free of carbon.

[2] The composition for a secondary battery negative electrode according to [1],
wherein the silicon oxide structure (b) is contained in a proportion of 18 to 90 mass % with respect to a total amount of the carbonaceous material (a) and the silicon oxide structure (b).

[3] The composition for a secondary battery negative electrode according to [1] or [2], wherein the silicon oxide structure (b) is contained in a proportion of 18 to 85 mass % with respect to a total amount of the carbonaceous material (a) and the silicon oxide structure (b).

[4] The composition for a secondary battery negative electrode according to any one of [1] to [3], wherein the silicon oxide structure (b) contains secondary aggregates in which the silicon-based nanoparticles (a) are aggregated as primary particles.

[5] The composition for a secondary battery negative electrode according to any one of [1] to [4], wherein the silicon oxide structure (b) additionally satisfies the following condition (iv):

(iv) in a spectrum obtained through infrared spectroscopy measurement, having a ratio ($I_1/I_2$) between an intensity ($I_1$) of a peak 1 derived from Si—H bonds at 820 to 920 $cm^{-1}$ and an intensity ($I_2$) of a peak 2 derived from Si—O—Si bonds at 1,000 to 1200 $cm^{-1}$ that is in a range of 0.01 to 0.35.

[6] The composition for a secondary battery negative electrode according to any one of [1] to [5], wherein the silicon oxide structure (b) additionally satisfies the following condition (v):

(v) in a spectrum obtained through infrared spectroscopy measurement, among peaks derived from Si—O—Si bonds, having a ratio ($I_{2-1}/I_{2-2}$) between an intensity ($I_{2-1}$) of a peak (peak 2-1) closest to 1,170 $cm^{-1}$ and an intensity ($I_{2-2}$) of a peak (peak 2-2) closest to 1,070 $cm^{-1}$ that exceeds 1.

[7] The composition for a secondary battery negative electrode according to any one of [1] to [6], wherein at least some of the silicon-based nanoparticles are bonded to the silicon oxide framework through Si—O—Si bonds.

[8] The composition for a secondary battery negative electrode according to any one of [1] to [7], wherein a metal oxide containing at least one selected from among titanium, zinc, zirconium, aluminum, and iron is additionally contained as a constituent element, and the silicon oxide structure (b) is coated with the metal oxide or composited with the metal oxide.

[9] The composition for a secondary battery negative electrode according to [8], wherein the metal oxide contains titanium as a constituent element.

[10] The composition for a secondary battery negative electrode according to any one of [1] to [9], wherein the volume-based average particle diameter of the silicon-based nanoparticles is 100 nm to 500 nm.

[11] The composition for a secondary battery negative electrode according to any one of [1] to [10], wherein the silicon-based nanoparticles are contained in a proportion of 5 to 65 mass % with respect to a total mass of the silicon oxide structure (b).

[12] The composition for a secondary battery negative electrode according to any one of [1] to [11], wherein the carbonaceous material (a) is a powder including substantially spherical particles and with a volume-based average particle diameter of 1 to 100 μm.

[13] The composition for a secondary battery negative electrode according to any one of [1] to [12], wherein the carbonaceous material (a) is graphite.

In addition, according to another aspect of the present invention, the following negative electrode for a secondary battery is provided.

[14] A negative electrode for a secondary battery comprising the composition for a secondary battery negative electrode according to any one of [1] to [13].

In addition, according to still another aspect of the present invention, the following secondary battery is provided.

[15] A secondary battery comprising the negative electrode for a secondary battery according to [14].

[16] The secondary battery according to [15], wherein the secondary battery is a lithium ion secondary battery.

DESCRIPTION OF THE EMBODIMENTS

Figure 1:
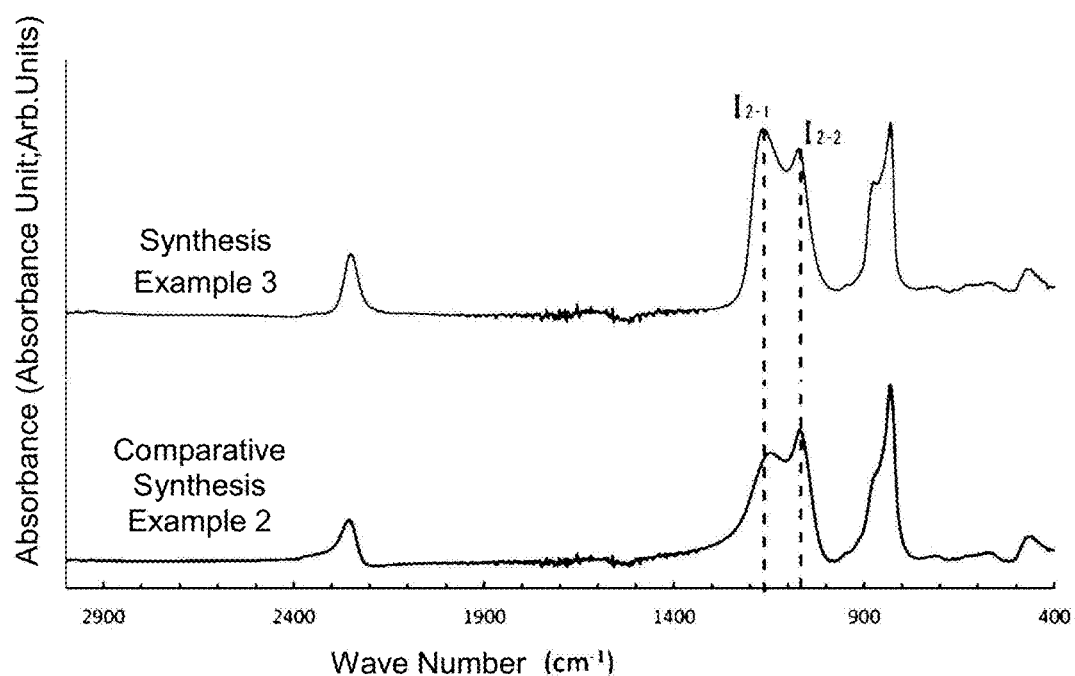
FIG. 1 shows IR absorption spectrum results obtained when infrared spectroscopy (IR) measurement is performed on a silicon nanoparticle-containing hydrogen polysilsesquioxane (3) and a hydrogen silsesquioxane polymer (1) obtained in Synthesis Example 3 and Comparative Synthesis Example 2.

According to the present invention, it is possible to improve at least one battery characteristic from a battery capacity and a discharging rate characteristic in secondary batteries.

The present invention will be described below with reference to specific embodiments. However, it should be noted that the present invention is not limited to the following embodiments and various modifications and alternations can be appropriately made without departing from the spirit and scope of the present invention.

A composition for a secondary battery negative electrode according to the present invention includes a carbonaceous material (a) and a silicon oxide structure (b) as essential components. The silicon oxide structure (b) includes a silicon oxide framework containing Si and O in its atomic composition and silicon-based nanoparticles that are chemically bonded to the silicon oxide framework as components. In addition, the silicon oxide structure (b) is contained in a proportion of 15 mass % or more with respect to a total amount of the carbonaceous material (a) and the silicon oxide structure (b). In addition, the silicon oxide structure (b) satisfies the following conditions (i) to (iii).

(i) Having an atomic composition represented by a general formula $SiO_{x2}H_{y2}$ ($0.3<x2<1.5$, $0.01<y2<0.35$);

(ii) having Si—H bonds; and (iii) being essentially free of carbon.

In the present invention, the "composition for a secondary battery negative electrode" is a material primarily used for forming a negative electrode for a secondary battery, and specifically, can be used as a main raw material or an additive as described below. As target secondary batteries, typically lead batteries, alkaline storage batteries, organic electrolytic solution batteries, power batteries, and the like are known. The composition for a secondary battery negative electrode of the present invention has applications which are not particularly limited and is widely used in a negative electrode for a secondary battery. However, in order for predetermined effects of the present invention to be more favorably exhibited, the composition is preferably used for forming a negative electrode of a lithium ion secondary battery or a lithium ion polymer secondary battery, and more preferably used for a lithium ion secondary battery.

Here, the "composition for a secondary battery negative electrode" of the present invention will be simply referred to as a "negative electrode composition."

A "silicon oxide framework containing Si and O in its atomic composition" in the present invention refers to a chemical framework having a silicon oxide structure composed of Si and O in at least a part thereof. More specifically, a chemical framework containing Si—O or Si—O—Si may be exemplified, and its meaning includes a framework of a silicon oxide structure generated by heating or sintering, for example, a silicon nanoparticle-containing hydrogen polysilsesquioxane polymer to be described below.

In addition, in the present invention, as indicated by the term "silicon-based nanoparticles chemically bonded to a silicon oxide framework," when silicon-based nanoparticles are chemically bonded to the above chemical framework, the entire silicon oxide structure is formed. Here, a form in which "silicon-based nanoparticles are chemically bonded to a silicon oxide framework" includes a case in which Si on the surface of silicon-based nanoparticles, for example, in a bonding mode of Si—O—Si, is bonded to a silicon oxide framework. Since such a chemical bond is strong, the silicon oxide structure of the present invention has a structure or properties in which silicon-based nanoparticles are unlikely to fall off from the structure.

In addition, in the silicon oxide structure of the present invention, formation of secondary aggregates in which silicon-based nanoparticles are aggregated is a preferable embodiment as will be described below.

According to the above configuration, since very small primary particles (that is, nanometer-size silicon-based nanoparticles) are primarily used, stress during expansion and contraction occurring when charging and discharging are repeated in a secondary battery is alleviated, and thus it can be expected that cycle deterioration will be reduced and there will be an effect of improvement in cycle characteristics. In addition, since the silicon oxide structure having the above configuration has a network structure according to secondary aggregates formed by aggregating primary particles, it has a better ability to bind to a binding agent, and exhibits superior cycle characteristics.

In addition, as will be described below, in the composition for a secondary battery negative electrode of the present invention, since the silicon oxide and carbonaceous material described above are mixed in predetermined proportions it is possible to improve at least one battery characteristic from a battery capacity and a discharging rate characteristic in addition to the above effects.

Next, the carbonaceous material (a) and the silicon oxide structure (b) which are essential components of the negative electrode composition according to the present invention will be described in detail.

[Carbonaceous material (a)] If a lithium ion secondary battery is exemplified, in the present invention, for a positive electrode, a Li intercalation compound such as $LiCoO_2$, $LiNiO_2$, and $LiMn_2O_4$ is used as an active material, and for a negative electrode, the carbonaceous material (a) is used as a material that can occlude and release (intercalate) Li ions during charging and discharging.

Examples of the carbonaceous material (a) include graphites such as natural graphite and artificial graphite, a coke type carbonaceous material such as pitch coke and needle coke, carbon black such as acetylene black, and carbonaceous materials such as fullerene, carbon nanotubes, carbon nanoforms, pitch type carbon fibers, polyacrylonitrile carbon fibers and amorphous carbon. These carbonaceous materials may be used alone or a combination of two or more thereof may be used.

In addition, in the present invention, as the carbonaceous material (a), an organic compound containing carbon or a material obtained by carbonizing a polymer according to a heat treatment can be used. Examples of such an organic compound containing carbon and a polymer include hydrocarbon gases such as methane, ethylene, propylene, and acetylene, sugars such as sucrose, glucose, and cellulose, glycol phenolic resins including ethylene glycol, diethylene glycol, polyethylene glycol, or propylene glycol, an epoxy resin, polyvinyl chloride, a polyvinyl alcohol, polypyrrole, and also petroleum pitch, coal tar pitch, and acetylene black.

In the present invention, the carbonaceous material (a) is not particularly limited as long as it is a material that can occlude and release Li ions during charging and discharging. However, graphite such as natural graphite and artificial graphite is preferably used because a large capacity is then obtained.

In addition, physical properties such as a form and a size of the carbonaceous material (a) are not particularly limited as long as an objective of the present invention can be achieved. Examples of the form of the carbonaceous material (a) include a squamous form, a clumped form, a scaly form, a fusiform form, and a spherical form in addition to the needle form and nanotube form described above. A carbonaceous material having a single form may be used or a combination of carbonaceous materials having two or more forms may be used.

In addition, when the carbonaceous material (a) is a powder or the like prepared in any of the above forms, a particle size thereof is not particularly limited. Generally, since many commercially available products having a particle size distribution in an arbitrary range of a micrometer size may be provided, one or more thereof may be appropriately selected, obtained and used depending on the purpose. When it is desired to realize a large capacity in a secondary battery such as a lithium ion battery, spherical graphite having a high bulk density and a relatively small specific surface area (for example, CGC series and CGB series commercially available from Nippon Graphite Industry Co., Ltd.) can be preferably used. More specifically, for example, a carbonaceous material having a volume-based average particle diameter of about 1 to 1,000 µm, preferably about 1 to 500 µm, more preferably about 5 to 100 µm, and most preferably about 5 to 50 µm may be exemplified. In addition, when it is desired to realize improvement in a battery capacity and rate characteristics to a higher level, spherical graphite having a volume-based average particle diameter in such a range is preferably used.

[Silicon Oxide Structure (b)]

(Silicon-Based Nanoparticles)

The concept of "silicon-based nanoparticles" in the present invention includes silicon-based nanoparticles substantially composed of only silicon and nanoparticles composed of a compound containing silicon in its atomic composition (for example, silica, and a silicon metal compound). Silicon-based nanoparticles are not particularly limited as long as they have a particle diameter (volume-based average particle diameter) that is in a nanometer-size range. In consideration of the fact that the composition according to the present invention is used for a negative electrode of a secondary battery, a volume-based average particle diameter (average particle diameter) of the silicon-based nanoparticles is, for example, 10 nm to 500 nm (or more than 10 nm and less than 500 nm), preferably 30 nm to 200 nm (or more than 30 nm and less than 200 nm). This is because, when silicon-based nanoparticles having a relatively small average particle diameter are used, cycle deterioration is reduced in the finally produced secondary battery, and excellent cycle characteristics can be exhibited. Here, in the present invention, "volume-based average particle diameter" refers to a particle diameter calculated based on the volume and may be simply referred to as an average particle diameter in some cases.

Here, silicon-based nanoparticles used in the present invention are not particularly limited, and commercially available silicon nano powder particles can be used. In addition, in the present invention, silicon-based nanoparticles may contain components other than silicon as long as desired effects are not impaired. The silicon nano-powder may contain, for example, metals and the like, of which the content is usually less than 5 mass % based on the silicon-based nanoparticles.

Next, the silicon oxide structure (b) will be described in detail.

In the present invention, the silicon oxide structure (b) is not particularly limited as long as it satisfies the following conditions (i) to (iii) as described above. When a silicon oxide structure that satisfies such conditions is used, it is possible to secure a favorable charging capacity and capacity retention rate, and improvement in cycle characteristics can be expected.

(i) Having an atomic composition represented by a general formula $SiO_{x2}H_{y2}$ ($0.3<x2<1.5$, $0.01<y2<0.35$);

(ii) having Si—H bonds; and (iii) being essentially free of carbon.

The silicon oxide structure that satisfies the above conditions (i) to (iii) is not particularly limited. For example, a hydrogen polysilsesquioxane sintered product produced based on the following process may be exemplified. A process of producing a hydrogen polysilsesquioxane sintered product will be described below.

<Process of Producing Silicon Nanoparticle-Containing Hydrogen Polysilsesquioxane Polymer>

First, a silicon nanoparticle-containing hydrogen polysilsesquioxane polymer which is a precursor of a hydrogen polysilsesquioxane sintered product is produced.

The silicon nanoparticle-containing hydrogen polysilsesquioxane polymer is obtained by hydrolyzing and polycondensing a silicon compound represented by General Formula (1) in the presence of silicon-based nanoparticles described above.

In Formula (1), R's are the same or different from each other, and are a halogen atom, a hydrogen atom, or a group selected from a substituted or unsubstituted alkoxy group having 1 to 10 carbon atoms and a substituted or unsubstituted aryloxy group having 6 to 20 carbon atoms. Here, in the substituted or unsubstituted alkoxy group having 1 to 10 carbon atoms and the substituted or unsubstituted aryloxy group having 6 to 20 carbon atoms, any hydrogen atom may be substituted with a halogen atom.

As the silicon compound represented by Formula (1), specifically, the following compounds and the like may be exemplified. For example, trihalogenated silanes and dihalogenated silanes such as trichlorosilane, trifluorosilane, tribromosilane, and dichlorosilane, trialkoxysilanes and dialkoxysilanes such as tri-n-butoxysilane, tri-t-butoxysilane, tri-n-propoxysilane, tri-i-propoxysilane, di-n-butoxyethoxysilane, triethoxysilane, trimethoxysilane, and diethoxysilane, and additionally, aryloxysilanes and aryloxyalkoxysilanes such as triaryloxysilanes, diaryloxysilanes, and diaryloxyethoxysilanes, may be exemplified.

Among these, in consideration of favorable reactivity, ease of availability, and low production costs, trihalogenated silanes or trialkoxysilanes are preferable, and trihalogenated silanes are particularly preferable.

In addition, a silicon compound may be used alone or a mixture of two or more types may be used.

Here, advantages obtained when a silicon compound is used include not only that hydrolyzability and condensation reactivity increase, and a desired silicon nanoparticle-containing hydrogen polysilsesquioxane polymer can be easily obtained, but also that an amount of Si—H bonds in a silicon oxide structure (silicon nanoparticle-containing hydrogen polysilsesquioxane sintered product) obtained according to a heat treatment under an inert gas atmosphere is easily controlled.

The silicon nanoparticle-containing hydrogen polysilsesquioxane polymer is obtained when a silicon compound represented by General Formula (1) is subjected to a hydrolysis reaction and a condensation reaction in the presence of silicon-based nanoparticles, as described above. However, any method may be used as a method of the hydrolysis reaction and the condensation reaction method. For example, there is a method in which, in addition to water, in an organic solvent such as an alcohol, acetone, hexane, and DMF or a solvent mixture thereof, any inorganic acid (e.g. hydrochloric acid) or organic acid (e.g. acetic acid) is added in the presence of the silicon-based nanoparticles, and a hydrolysis reaction and a condensation reaction of the silicon compound are caused to occur at room temperature or under heating. Accordingly, in a reaction solution after hydrolysis, a solvent, an acid, and water, and a substance derived therefrom may be contained in addition to a hydrolysate of the silicon compound.

In addition, in the reaction solution after hydrolysis, finally, the silicon compound represented by General Formula (1) may not be completely hydrolyzed or a part thereof may remain. Thus, in this case, in addition to the hydrolysis reaction, the polycondensation reaction of the hydrolysate generated according to the hydrolysis reaction partially proceeds in parallel. Here, a degree of progress of the polycondensation reaction can be controlled using reaction conditions such as a hydrolysis temperature, a hydrolysis time, an acidity, and/or a type and an amount of a solvent. For example, these factors or elements can be appropriately set in consideration of properties of a desired silicon oxide structure as will be described below.

In the present invention, in order to realize efficient productivity and low production cost, a method in which a hydrolysis reaction and a polycondensation reaction are caused to occur in parallel in one reaction chamber under the same conditions is favorable.

Regarding the reaction conditions, under stirring, the silicon compound represented by Formula (1) according to the present invention is added to an acidic aqueous solution and a reaction is caused at a temperature of −20° C. to 50° C., preferably 0° C. to 40° C., and particularly preferably 10° C. to 30° C., and for 0.5 hours to 20 hours, preferably 1 hour to 10 hours, and particularly preferably 1 hour to 5 hours. In addition, addition of the silicon compound represented by Formula (1) to the silicon nanoparticle dispersion solution is not particularly limited. The silicon compound may be added all at once or may be added in small amounts for a plurality of times. Preferably, the silicon compound is added dropwise in small amounts for a plurality of times.

An acidity of the reaction solution is generally a pH of 7 or less, and is preferably adjusted to a pH of 6 or less, and particularly preferably a pH of 5 or less, and in some cases, a pH of 4.5 or less or a pH of 3 or more, can be used. However, an actual pH value of the reaction solution may be appropriately determined in consideration of properties of a polymer or silicon oxide structure (sintered product) to be obtained, and conditions such as a type of an acid or a base used for pH adjustment, and is not limited to such a pH range. Any of an organic acid and an inorganic acid can be used as an acid used for pH adjustment. Specifically, examples of an organic acid include formic acid, acetic acid, propionic acid, oxalic acid, and citric acid, and examples of an inorganic acid include hydrochloric acid, sulfuric acid, nitric acid, and phosphoric acid. In consideration of easy control of a hydrolysis reaction and a subsequent polycondensation reaction, ease of a treatment after a reaction, and additionally, ease of availability, cost, handling properties, and the like, hydrochloric acid is particularly preferably used.

In addition, when a halogenated silane such as trihalogenated silane is used as the silicon compound represented by Formula (1), since an acidic aqueous solution is formed in the presence of water, particularly, there is no need to separately add an acid, which is one preferable form of the present invention.

In addition, generally, the hydrolysis solution is usually adjusted to the acidic side. However, it is assumed that, in order to realize various physical properties and characteristics in a silicon nanoparticle-containing hydrogen polysilsesquioxane and its sintered product, it may be necessary to adjust the hydrolysis solution to the alkaline side in some cases. In this case, examples of a base used for pH adjustment include sodium hydroxide, calcium hydroxide, potassium hydroxide, ammonia, and the like.

Here, in the present invention, when silicon-based nanoparticles are included, the obtained secondary battery exhibits a particularly excellent discharging capacity, initial discharging efficiency and cycle characteristics.

As a specific method for causing a hydrolysis reaction and a polycondensation reaction of the silicon compound to occur in the presence of silicon-based nanoparticles, for example, the following method may be exemplified. That is, the silicon compound and silicon-based nanoparticles, and a mixture of solvents such as water and an organic solvent are prepared, and the mixture may be subjected to a hydrolysis reaction and a condensation reaction. Alternatively, silicon-based nanoparticles are dispersed in a solvent according to sonication and mechanical stirring, and the like, and thus a silicon-based nanoparticle dispersion solution is previously prepared. This dispersion solution may be adjusted to a desired pH value by adding an acid optionally. Thus, the silicon compound represented by General Formula (1) is added (added dropwise) to the silicon-based nanoparticle dispersion solution prepared in this manner and thus a hydrolysis reaction and a condensation reaction of the silicon compound may occur.

Although the amount of the silicon-based nanoparticles is not particularly limited, generally 5 mass % to 65 mass %, and preferably 10% by mass to 60% by mass are mixed in with respect to the obtained silicon-based nanoparticle-containing hydrogen polysilsesquioxane. If an amount of silicon-based nanoparticles is 5 mass % or more, when its sintered product is used as a negative electrode active material of a lithium ion battery, initial charging and discharging efficiency is high and an effect of compositing with silicon-based nanoparticles can be sufficiently and reliably obtained. In addition, if an amount of silicon-based nanoparticles is 65 mass % or less, when its sintered product is used as a negative electrode active material of a lithium ion battery, due to stress relaxation of composited hydrogen silsesquioxane, an expansion and contraction rate of the negative electrode active material according to charging and discharging does not increase and a sufficient capacity retention rate can be maintained.

Here, other reaction conditions (a reaction temperature, a reaction time, a pH, and the like) are as described above.

After a hydrolysis reaction and a polycondensation reaction of the silicon compound are completed as described above, a silicon nanoparticle-containing hydrogen silsesquioxane polymer is produced in the solution. While the reaction solution can be directly subjected to the following heat treatment process, a solid content of the silicon nanoparticle-containing hydrogen silsesquioxane polymer may be separated from the reaction solution using a process of removing a liquid part and separating off a solid content based on a method such as drying under a reduced pressure, filtration and separation, centrifugation, decantation, or suction. In addition, in some cases, the solid content may be washed with water, an organic solvent, or the like, and then dried, and subjected to the following heat treatment process.

<Structure of Silicon Nanoparticle-Containing Hydrogen Polysilsesquioxane>

When the composition of the silicon nanoparticle-containing hydrogen polysilsesquioxane obtained as described above is analyzed by elemental analysis, the atomic composition contains silicon (Si), oxygen (O) and hydrogen (H) and is represented by a general formula $SiO_{x1}H_{y1}$ (0.25<x1<1.35, 0.16<y1<0.90). In addition, the silicon nanoparticle-containing hydrogen polysilsesquioxane is essentially free of carbon.

In addition, when a silicon nanoparticle-containing hydrogen polysilsesquioxane with a general formula $SiO_{x1}H_{y1}$ in which x1 is in a range of 0.25<x1<1.35, and preferably 0.28<x1<1.3 is sintered, it is possible to obtain a sintered substance (negative electrode active material) having a sufficient battery capacity and excellent charging and discharging characteristics with a good balance between initial charging and discharging efficiency and a cycle capacity retention rate. In addition, when y1 is in a range of 0.16<y1<0.90, and preferably 0.16<y1<0.86, a secondary battery obtained using the sintered product of a silicon nanoparticle-containing hydrogen polysilsesquioxane can have an excellent charging and discharging capacity and favorable cycle characteristics with an improved capacity retention rate. Therefore, a silicon oxide structure having an atomic composition that satisfies the above range of x1 and/or y1 is particularly preferable.

In addition, the silicon nanoparticle-containing hydrogen polysilsesquioxane obtained as described above is thought to have a ratio ($I_{2-1}/I_{2-2}$) between an intensity ($I_{2-1}$) of a peak 2-1 near 1,170 cm$^{-1}$ and an intensity ($I_{2-2}$) of a peak 2-2 near 1,070 cm$^{-1}$ among peaks derived from Si—O—Si bonds which is greater than 1 in consideration of a spectrum obtained through infrared spectroscopy measurement in the following reference example. When the peak intensity ratio exceeds 1, this suggests that chemical bonds are formed between silicon-based nanoparticles and hydrogen polysilsesquioxane present therein and due to the presence of the chemical bonds, particle collapse caused when silicon particles expand and contract during charging and discharging cycles is thought to be reduced. A silicon oxide structure that satisfies such a peak ratio relationship can be particularly preferably used in the present invention because it can realize favorable battery characteristics.

Figure 2:
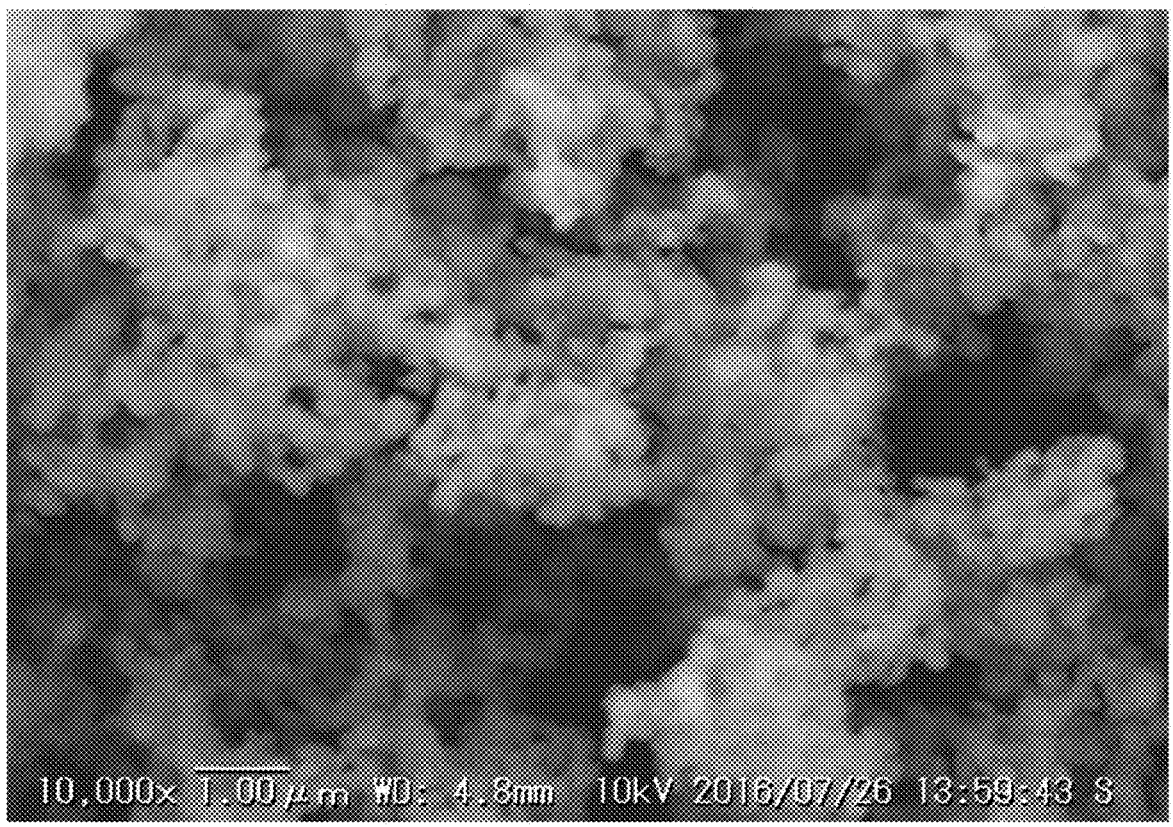
FIG. 2 is an electronic microscope (SEM) image of a silicon nanoparticle-containing hydrogen polysilsesquioxane (3) obtained in Synthesis Example 3.

As can be clearly understood from an SEM image shown in FIG. 2, in the silicon nanoparticle-containing hydrogen polysilsesquioxane obtained in this manner, primary particles, which are spherical particles having a submicron particle diameter, aggregate and thus secondary aggregates having a particle diameter of several microns are formed.

As described above, since the primary particles are small, when such a sintered product of the silicon nanoparticle-containing hydrogen polysilsesquioxane is used as the silicon oxide structure (b) in the composition for a secondary battery negative electrode according to the present invention, stress during expansion and contraction occurring when charging and discharging are repeated is alleviated. As a result, a cycle characteristic improvement action through which cycle deterioration can be reduced can be expected. In addition, since there is a composite secondary structure with silicon-based nanoparticles and silicon oxide, the silicon oxide structure (b) has a better ability to bind to a binding agent, and can exhibit superior cycle characteristics in a secondary battery.

<Heat Treatment Process>

Specifically, the silicon oxide structure (b) in the present invention is obtained by heating the silicon nanoparticle-containing hydrogen polysilsesquioxane polymer obtained through the above process under a non-oxidizing atmosphere.

The term "non-oxidizing" here does not mean that no oxygen is contained but means that generation of silicon dioxide when the silicon nanoparticle-containing hydrogen polysilsesquioxane is heated is substantially reduced to an extent that the effects of the present invention are not adversely affected due to a content of oxygen. In other words, "non-oxidizing" means that oxygen is removed to such an extent. In this regard, as will be described below, it is preferable for an oxygen content to cause a value of $I_1/I_2$ of a product after a heat treatment which is in a predetermined range. Here, $I_1$ refers to an intensity ($I_1$) of the peak 1 derived from Si—H bonds at 820 to 920 cm$^{-1}$. In addition, $I_2$ refers to an intensity ($I_2$) derived from Si—O—Si bonds at 1,000 to 1,200 cm$^{-1}$. When the composition of the silicon nanoparticle-containing hydrogen polysilsesquioxane sintered product obtained in this manner is analyzed by elemental analysis, the silicon nanoparticle-containing hydrogen polysilsesquioxane sintered product contains silicon (Si), oxygen (O) and hydrogen (H), and is represented by a general formula $SiO_{x2}H_{y2}$ (0.3<x2<1.5, 0.01<y2<0.35), and is essentially free of carbon. That is, in the present invention, it is essential for the silicon oxide structure (b) to have an atomic composition represented by a general formula $SiO_{x2}H_{y2}$ (0.3<x2<1.5, 0.01<y2<0.35) as the condition (i), and the silicon nanoparticle-containing hydrogen polysilsesquioxane sintered product obtained as described above satisfies such condition.

Regarding the condition (i), when x2 is in a range of 0.3<x2<1.5, and preferably 0.4<x2<1.0, in the secondary battery according to the present invention, a sufficient battery capacity is secured and excellent charging and discharging characteristics with a good balance between initial charging and discharging efficiency and a cycle capacity retention rate can be exhibited. In addition, when y2 is in a range of 0.01<y2<0.35, and preferably 0.01<y2<0.3, in the secondary battery according to the present invention, a charging and discharging capacity and a capacity retention rate are improved, and favorable cycle characteristics are exhibited.

In addition, in the silicon nanoparticle-containing hydrogen polysilsesquioxane sintered product (the silicon oxide structure (b)) obtained in the above process, in a spectrum obtained through infrared spectroscopy (IR) measurement, a ratio ($I_1/I_2$) between an intensity ($I_1$) of a peak 1 derived from Si—H bonds at 820 to 920 cm$^{-1}$ and an intensity ($I_2$) of a peak 2 derived from Si—O—Si bonds at 1,000 to 1,200 cm$^{-1}$ is preferably in a range of 0.01 to 0.35. The peak ratio ($I_1/I_2$) is more preferably in a range of 0.01 to 0.30, and still more preferably in a range of 0.03 to 0.20. When the peak ratio ($I_1/I_2$) is in such a range, there is an appropriate amount of Si—H bonds, and in the secondary battery according to the present invention, a high discharging capacity is secured and favorable initial charging and discharging efficiency and cycle characteristics can be exhibited.

In addition, in the silicon nanoparticle-containing hydrogen polysilsesquioxane sintered product (the silicon oxide structure (b)) obtained in the above process, in a spectrum obtained through infrared spectroscopy measurement, a ratio ($I_{2-1}/I_{2-2}$) between an intensity ($I_{2-1}$) of a peak 2-1 near 1,170 cm$^{-1}$ and an intensity ($I_{2-2}$) of a peak 2-2 near 1,070 cm$^{-1}$ among peaks derived from Si—O—Si bonds is preferably greater than 1. When the peak intensity ratio exceeds 1, this suggests that chemical bonds are formed between the silicon oxide structure (b) or silicon-based nanoparticles present in the silicon nanoparticle-containing hydrogen polysilsesquioxane sintered product and a framework of a hydrogen polysilsesquioxane-derived silicon oxide structure, and due to the presence of the chemical bonds, particle collapse caused when silicon particles expand and contract during charging and discharging cycles is thought to be reduced.

As described above, a heat treatment of the silicon nanoparticle-containing hydrogen polysilsesquioxane is preferably performed under a non-oxidizing atmosphere. This is because, when a heat treatment is performed under an atmosphere in which there is an excessive amount of oxygen, silicon dioxide is generated and thus a desired composition and amount of Si—H bonds may not be obtained. Examples of the non-oxidizing atmosphere include an inert gas atmosphere and an atmosphere from which oxygen is removed by a high vacuum, but any atmosphere in which oxygen is removed so that generation of a desired silicon nanoparticle-containing hydrogen polysilsesquioxane sintered product is not inhibited is sufficient, and a reducing atmosphere and an atmosphere in which such atmospheres are combined are also included. Examples of the inert gas include nitrogen gas, argon gas, and helium gas. These inert gases can be used without any limitation as long as they satisfy high purity standards that are generally used. In addition, without using an inert gas, an atmosphere from which oxygen is removed by a high vacuum may be used. Examples of the reducing atmosphere include an atmosphere containing a reducing gas such as hydrogen gas. For example, a mixed gas atmosphere containing hydrogen gas and 2 volume % or more of an inert gas may be exemplified. In addition, as a reducing atmosphere, a hydrogen gas atmosphere can be used.

When the silicon nanoparticle-containing hydrogen polysilsesquioxane is heated under a non-oxidizing atmosphere, dehydrogenation of Si—H bonds starts near 600° C., Si—Si bonds are formed, and a framework of a characteristic silicon oxide structure derived from hydrogen polysilsesquioxane is formed. Also if the heat treatment is performed, chemical bonds between silicon-based nanoparticles and hydrogen polysilsesquioxane are maintained. The presence of the framework of the hydrogen polysilsesquioxane-derived silicon oxide structure after a heat treatment can be ascertained from measurement through infrared spectroscopy to be described below. When Si—Si bonds appropriately grow, they become favorable Li occlusion sites and serve as a high charging capacity source. On the other hand, since Si—H bonds interact with a binding agent which is a known battery material component and has a functional group such as a COO group and flexible and firm bonds are formed, favorable cycle characteristics are exhibited in the secondary battery.

Therefore, in order to exhibit a large capacity and favorable cycle characteristics in a well-balanced manner in the secondary battery, an appropriate amount of Si—H bonds preferably remains, and a heat treatment temperature at which such conditions are satisfied is generally 600° C. to 1,000° C., and preferably 750° C. to 900° C. When the temperature is less than 600° C., an amount of Si—H bonds is too large, and a discharging capacity may be insufficient. On the other hand, when the heat treatment temperature exceeds 1,000° C., an excessive amount of Si—H bonds may be eliminated. When an excessive amount of Si—H bonds is eliminated, favorable cycle characteristics are not obtained, additionally, a strong $SiO_2$ layer is formed on the surface, insertion and detachment of lithium is inhibited, and thus a capacity is unlikely to be obtained. However, an amount of Si—H bonds is affected according to various silicon nanoparticle-containing hydrogen polysilsesquioxanes subjected to a heat treatment and other conditions such as a heat treatment time, and thus the above values for the heat treatment temperature are simply a guideline, and are not intended to limit the present invention.

The heat treatment time is not particularly limited, and is generally 30 minutes to 10 hours, and preferably 1 to 8 hours.

Regarding heat treatment conditions including a heat treatment temperature and a heat treatment time, generally, they may be appropriately set so that an atomic composition of a sintered substance produced, $SiO_{x2}H_{y2}$ is in the range of ($0.3<x2<1.5$, $0.01<y2<0.35$) in the elemental analysis results described above. In addition, when the sintered substance is measured through infrared spectroscopy, heat treatment conditions are preferably set so that a ratio ($I_1/I_2$) between an intensity ($I_1$) of a peak 1 and an intensity ($I_2$) of a peak 2 is in a range of 0.01 to 0.35.

Figure 4:
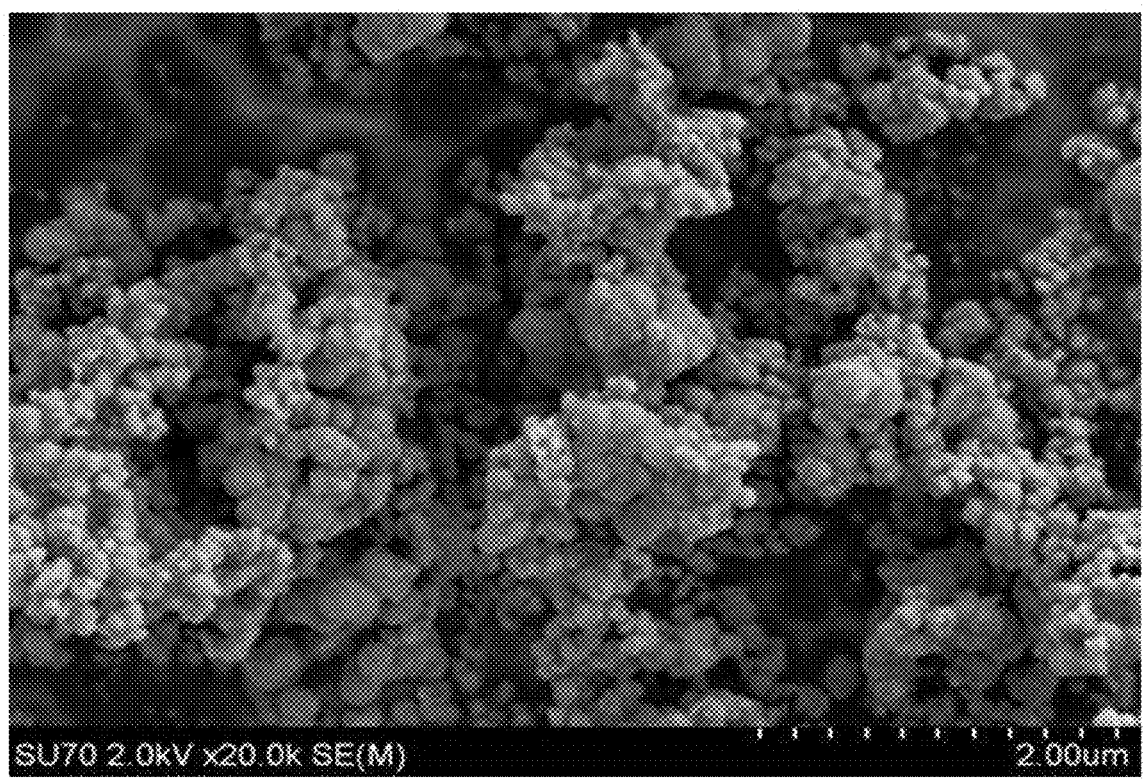
FIG. 4 shows an SEM image of the silicon nanoparticle-containing hydrogen polysilsesquioxane sintered product (5) obtained in Synthesis Example 5.

As can be clearly understood from an SEM image shown in FIG. 4, in the silicon nanoparticle-containing hydrogen polysilsesquioxane sintered product obtained in this manner, spherical primary particles having a submicron particle diameter aggregate, and additionally, secondary aggregates having a particle diameter of several microns are formed.

Since there are spherical primary particles having a submicron particle diameter, in the secondary battery according to the present invention, stress during expansion and contraction occurring in a negative electrode when charging and discharging are repeated is alleviated. As a result, since cycle deterioration is reduced, an effect of improvement in cycle characteristics can be expected. In addition, since there is a secondary structure according to the secondary aggregates described above, the silicon oxide structure in the composition for a secondary battery negative electrode according to the present invention has a better ability to bind to a binding agent, and superior cycle characteristics are exhibited.

<Coating or Compositing of Silicon Oxide Structure (b) with Metal Oxide>

In the present invention, the silicon oxide structure (b) may be optionally coated with a metal oxide or composited with a metal oxide. When the silicon oxide structure which is coated with a metal oxide or composited with a metal oxide and contains silicon-based nanoparticles is used, due to the presence of a metal oxide in the secondary battery, not only higher speed charging and discharging is possible, but also superior charging and discharging cycle characteristics are exhibited, and a significant improvement in battery characteristics such as a large capacity, initial charging and discharging efficiency, and a capacity retention rate can be expected.

Hereinafter, a method of producing a silicon oxide structure which is coated with a metal oxide or composited with a metal oxide and contains silicon-based nanoparticles (hereinafter simply referred to as a metal oxide-coated silicon oxide structure) will be described.

Specifically, the metal oxide-coated silicon oxide structure can be obtained according to a process (coating/compositing process) in which the silicon nanoparticle-containing hydrogen polysilsesquioxane sintered product produced as described above is coated with a metal oxide or composited with the metal oxide.

Here, the term "coated or composited" means that a metal oxide is fused to and integrated with a silicon nanoparticle-containing hydrogen polysilsesquioxane sintered product, and includes, for example, a form in which a metal oxide is contained inside the silicon oxide structure (silicon nanoparticle-containing hydrogen polysilsesquioxane sintered product), a form in which a metal oxide is bonded to a surface of the silicon oxide structure (silicon nanoparticle-containing hydrogen polysilsesquioxane sintered product) according to chemical bonding or any interaction, and a form in which the silicon oxide structure (silicon nanoparticle-containing hydrogen polysilsesquioxane sintered product) is partially or completely coated with a metal oxide. In the present invention, in particular, a form in which, in the silicon oxide structure (silicon nanoparticle-containing hydrogen polysilsesquioxane sintered product), primary particles and secondary particles/secondary aggregates (hereinafter simply referred to as particles) are coated with a metal oxide is preferable. Regarding coating, not all particles are necessarily coated and some particles may be partially coated. In addition, it is not necessary that the entire silicon nanoparticle-containing hydrogen polysilsesquioxane sintered product is coated, and a part thereof may be coated.

As the metal oxide, a metal oxide containing at least one selected from among titanium, zinc, zirconium, aluminum, and iron as a constituent element is preferable, and an oxide containing titanium is more preferable. As the oxide containing titanium, a metal oxide containing 80 mass % or more of titanium with respect to all metal elements is preferable, and a metal oxide containing 90 mass % or more of titanium is preferable. Examples of such a metal oxide include a metal oxide (specifically, a titanium oxide) containing only titanium as a metal element except for impurities.

The metal oxide may further contain at least one selected from the group consisting of hafnium, vanadium, niobium, tantalum, chromium, molybdenum, tungsten, manganese, ruthenium, cobalt, rhodium, iridium, nickel, palladium, cerium, indium, germanium, bismuth, antimony, cadmium, copper, and silver as a constituent element.

Various methods can be used as a method of applying a metal oxide to particles in the silicon oxide structure (silicon nanoparticle-containing hydrogen polysilsesquioxane sintered product). For example, there is a method in which the silicon oxide structure (silicon nanoparticle-containing hydrogen polysilsesquioxane sintered product) is added to a suspension solution in which metal oxide particles are suspended in a solvent and then filtering, drying, and the like are performed. In particular, a method in which the silicon oxide structure (silicon nanoparticle-containing hydrogen polysilsesquioxane sintered product) is suspended in an alkoxy metal compound, and then a condensation reaction is caused, and a coating of the alkoxy metal compound is formed on the surface of the silicon nanoparticle-containing hydrogen polysilsesquioxane sintered product and dried is preferable.

As the metal alkoxide compound, alkoxides of a metal of the desired metal oxide can be used. For example, when a coating material is a titanium oxide, alkoxytitaniums may be used. Examples of alkoxytitaniums include tetraalkoxytitaniums, aryloxytrialkoxytitaniums, and diaryldialkoxytitaniums. Tetraalkoxytitaniums are preferable, and specifically, tetraoctoxytitanium, tetra-n-butoxytitanium, tetra-i-propoxytitanium, tetrakis(2-ethylhexyloxy)titanium, and the like may be exemplified.

A condensation reaction between the silicon oxide structure in the suspension solution and a metal alkoxide such as alkoxy titanium is not particularly limited. For example, in addition to water, in an organic solvent such as an alcohol, acetone, and hexane or a solvent mixture thereof, as necessary, an inorganic acid such as hydrochloric acid and/or an organic acid such as acetic acid are added thereto, and the reaction can be caused at room temperature or during heating.

As reaction conditions, under stirring, a reaction is caused at a temperature of −20° C. to 50° C., preferably 0° C. to 40° C., and particularly preferably 10° C. to 30° C. for 0.5 hours to 20 hours, preferably 1 hour to 10 hours, and particularly preferably 1 hour to 5 hours.

In addition, regarding a ratio between of the silicon oxide structure and a metal alkoxide used, in the finally obtained silicon oxide structure/metal oxide coated product or composite product, the proportion of the metal oxide can be adjusted so that it generally exceeds 0 mass % and is in a range of 10 mass % or less, preferably 0.1 mass % to 10 mass %, and more preferably 0.2 mass % to 8 mass %.

After the condensation reaction is completed, a liquid part is removed according to a method such as drying under a reduced pressure, filtration and separation, centrifugation, decantation, or suction, and a process of separating off a solid content is provided, and a solid content corresponding to a precursor of the coating material or composite product may be separated from a reaction product liquid. In addition, in some cases, the solid content is washed with water, an organic solvent, or the like, and then dried, and additionally optionally subjected to the following heat treatment process.

The silicon oxide structure/metal oxide coated product or composite product can be obtained by heating the precursor obtained in the above method under a non-oxidizing gas atmosphere. A heat treatment temperature is not particularly limited. However, in order to significantly reduce charging and discharging cycle deterioration in the secondary battery and obtain a large capacity and exhibit favorable charging and discharging characteristics, the heat treatment temperature can be typically 200° C. to 900° C., preferably 250° C. to 850° C., and more preferably 250° C. to 800° C. The heat treatment time is not particularly limited, and generally 30 minutes to 10 hours, and preferably 1 hour to 8 hours.

In the coated product or composite product obtained in this manner, a metal oxide is composited with or coated on the surface or inside the silicon nanoparticle-containing hydrogen polysilsesquioxane sintered product. For example, in silicon nanoparticle-containing hydrogen polysilsesquioxane sintered product metal oxide composite products obtained in the following synthesis examples and examples, a peak assigned to a 2p electron of titanium in a titanium oxide and a peak assigned to a 1s electron of oxygen in a titanium oxide are confirmed through X-ray photoelectron spectroscopic analysis (refer to FIG. 5). Accordingly, in the silicon nanoparticle-containing hydrogen polysilsesquioxane sintered product metal oxide composite products of examples, particles of the silicon nanoparticle-containing hydrogen polysilsesquioxane sintered product are coated with the form of a titanium oxide.

As effects of the composite metal oxide, particularly, a titanium oxide, the following three effects are conceivable. The first effect is imparting conductivity to an active material. While the titanium oxide itself is an insulator, it becomes conductive if electrons are injected into a conduction band due to insertion of lithium, and electron conductivity on the surface of an active material can be significantly improved during charging. The second effect is promoting transfer of lithium at an interface of an active material electrolytic solution. For a charging reaction of the silicon nanoparticle-containing hydrogen polysilsesquioxane sintered product, large energy is required to proceed the reaction according to breakage of silicon oxygen bonds. However, through a titanium oxide in which lithium ions can be removed or inserted with relatively low energy, an active barrier at an interface of the electrolytic solution active material is reduced, and a charging and discharging reaction can proceed smoothly. The third effect is stabilizing the shape. Since lithium ions can be removed and inserted in a titanium oxide without causing a structural change, when a titanium oxide is disposed on the surface, the shape is stabilized, and it is possible to reduce a decomposition reaction in the electrolytic solution due to falling off of the active material or development of a new surface.

It is thought that, while silicon oxide used in the present invention itself has high charging and discharging cycle stability, when a titanium oxide is applied, the above effects are added and higher charging and discharging cycle stability can be obtained. The above effects are effects exhibited not only in a titanium oxide but also a metal oxide containing zinc, zirconium, aluminum, and iron.

<Preparation of Composition for a Secondary Battery Negative Electrode>

A composition for a secondary battery negative electrode according to the present invention can be prepared by mixing the carbonaceous material (a) and the silicon oxide structure (b) (for example, the above silicon nanoparticle-containing hydrogen polysilsesquioxane sintered product) at the above predetermined proportion.

Regarding a ratio between the carbonaceous material (a) and the silicon oxide structure (b), with respect to a total amount of the carbonaceous material (a) and the silicon oxide structure (b), the silicon oxide structure (b) is contained in a proportion of 15 mass % or more. According to such mixing proportions of the carbonaceous material (a) and the silicon oxide structure (b), in the secondary battery, it is possible to improve at least one battery characteristic from a battery capacity and a discharging rate characteristic. In addition, with respect to a total amount of the carbonaceous material (a) and the silicon oxide structure (b), the silicon oxide structure (b) is preferably contained in a proportion of 18 mass % to 90 mass %, more preferably, 18 mass % to 85 mass %, and most preferably 25 mass % to 85 mass %. When such a mixing proportion range is used, it is possible to improve at least one battery characteristic from a battery capacity and a discharging rate characteristic in the secondary battery, reduce cycle deterioration, and secure a favorable capacity retention rate.

Since batteries are required to have a large capacity and perform charging and discharging with a large current, materials with low electrical resistance for electrodes are required.

Therefore, in the composition for a secondary battery negative electrode of the present invention, the silicon oxide structure (b) (silicon nanoparticle-containing hydrogen polysilsesquioxane sintered product) and the carbonaceous material (a) are mixed at the above predetermined proportions. Here, the silicon oxide structure (b) (silicon nanoparticle-containing hydrogen polysilsesquioxane sintered product) and the carbonaceous material (a) may be composited or the former may be coated with the latter.

As a method of realizing such compositing or coating, there is a method in which the silicon nanoparticle-containing hydrogen polysilsesquioxane sintered product and a carbon-based material are dispersed according to mechano-fusion or a mechanical mixing method using a ball miller or a vibration miller.

The composition for a secondary battery negative electrode according to the present invention may additionally contain a binding agent, which is not essential. The binding agent may be added later at a timing such as during formation of an electrode.

Regarding the binding agent, various binding agents that are generally used for the secondary battery are known, and these can be used. Specifically, a binding agent having a functional group such as a COO group which interacts with Si—H bonds on the negative electrode active material is preferably used. For example, carboxymethyl cellulose, polyacrylic acid, alginic acid, glucomannan, amylose, sucrose, and derivatives and polymers thereof, and further, in addition to alkali metal salts thereof, a polyimide resin and a polyimide amide resin may be exemplified. Such binding agents may be used alone and a mixture thereof may be used, and additionally, a component for imparting functions of improving a binding ability with a current collector, improving dispersibility, and improving conductivity of a binding agent itself, for example, a styrene butadiene rubber-based polymer or a styrene butadiene and rubber-based polymer, may be added and mixed.

The composition for a secondary battery negative electrode according to the present invention may further contain various components such as a conductive material in consideration of desired effects and applications.

<Negative Electrode for a Secondary Battery>

A negative electrode for a secondary battery according to the present invention is formed using the composition for a secondary battery negative electrode of the present invention. For example, the negative electrode for a secondary battery of the present invention can be produced using a method of forming the composition for a secondary battery negative electrode of the present invention into a certain shape, or a method of applying the composition for a secondary battery negative electrode to a current collector such as a copper foil. The method of forming a negative electrode is not particularly limited, and various known methods can be used.

More specifically, the composition for a secondary battery negative electrode of the present invention is directly applied to a current collector that mainly contains copper, nickel, or stainless steel, or the composition is separately cast onto a support, a composition film (negative electrode active material film) is peeled off from the support, and the film is laminated on the current collector to obtain a negative electrode plate. Here, the shape of the current collector is not particularly limited, and examples thereof include a plate shape, a foil shape, and a net shape.

Here, if a binding agent, a conductive material, or the like is not mixed in advance into the negative electrode composition for a secondary battery of the present invention, when a negative electrode for a secondary battery is formed, such components are mixed into the negative electrode composition for a secondary battery of the present invention, and the negative electrode described above can be formed.

<Secondary Battery>

A secondary battery according to the present invention may be appropriately designed in consideration of desired applications, functions, and the like, and a configuration thereof is not particularly limited. With reference to configurations of secondary batteries of the related art, a secondary battery can be constructed using the negative electrode according to the present invention. In addition, the type of the secondary battery of the present invention is not particularly limited as long as the negative electrode of the present invention can be applied. For example, a lithium ion secondary battery and a lithium ion polymer secondary battery may be exemplified. As will be verified in the following examples, such batteries can be said to be particularly preferable embodiments because desired effects of the present invention can be exhibited.

A method of producing a lithium ion battery and a configuration will be exemplified below.

First, a positive electrode active material that can reversibly occlude and release lithium ions, a conductive additive, a binding agent and a solvent are mixed to prepare a positive electrode active material composition. As in the negative electrode, the positive electrode active material composition is directly applied onto a metal current collector and dried using various methods to prepare a positive electrode plate. The positive electrode active material composition is separately cast onto a support, a film formed on the support is peeled off, the film is laminated on a metal current collector, and thereby a positive electrode can be produced. A method of forming a positive electrode is not particularly limited, and various known methods can be used for formation.

As the positive electrode active material, a lithium metal composite oxide that is generally used in the field of the secondary battery can be used. For example, a lithium cobaltate, a lithium nickelate, a lithium manganite having a spinel structure, a lithium cobalt manganate, an iron phosphate having an olivine structure, a so-called ternary lithium metal composite oxide, and a nickel-based lithium metal composite oxide may be exemplified. In addition, $V_2O_5$, TiS and MoS which are a compound in which lithium ions can be removed and inserted can be used.

A conductive additive may be added, and those that are generally used for lithium ion batteries can be used. An electron conductive material that does not cause decomposition or deterioration in the produced battery is preferable. As a specific example, carbon black (such as acetylene black), graphite fine particles, vapor grown carbon fibers, and a combination of two or more thereof may be exemplified. In addition, examples of the binding agent include a vinylidene fluoride and propylene hexafluoride copolymer, polyvinylidene fluoride (PVDF), polyacrylonitrile, polymethyl methacrylate, polytetrafluoroethylene and mixtures thereof, and a styrene butadiene rubber-based polymer, but the present invention is not limited thereto. In addition, examples of the solvent include N-methyl pyrrolidone, acetone, and water, but the present invention is not limited thereto.

In this case, contents of a positive electrode active material, a conductive additive, a binding agent and a solvent are not particularly limited, but they can be appropriately selected based on amounts that are generally used for lithium ion batteries.

A separator interposed between a positive electrode and a negative electrode is not particularly limited, and those that are generally used for lithium ion batteries may be used. In consideration of desired applications and functions, and the like, the separator may be appropriately selected. A separator having low resistance with respect to ion transfer of an electrolyte or excellent electrolytic solution impregnating properties is preferable. Specifically, a separator may be made of a material selected from among glass fibers, polyester, polyethylene, polypropylene, polytetrafluoroethylene, polyimide, and compounds thereof and have a nonwoven fabric or woven fabric form.

More specifically, in the case of lithium ion batteries, a windable separator made of a material such as polyethylene and polypropylene is used is used, and in the case of lithium ion polymer batteries, a separator having an excellent organic electrolytic solution impregnating property is preferably used.

As an electrolytic solution, a solution in which one of electrolytes composed of lithium salts such as lithium hexafluorophosphate, lithium tetrafluoroborate, lithium hexafluoroantimonate, lithium hexafluoroarsenate, lithium perchlorate, lithium trifluoromethane sulfonate, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (here, x and y are a natural number), LiCl, and LiI, or a mixture of two or more thereof is dissolved in a solvent such as propylene carbonate, ethylene carbonate, dimethyl carbonate, diethyl carbonate, ethyl methyl carbonate, methyl propyl carbonate, butylene carbonate, dibutyl carbonate, benzonitrile, acetonitrile, tetrahydrofuran, 2-methyltetrahydrofuran, γ butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene or diethyl ether, or solvent mixtures thereof can be used.

In addition, other various non-aqueous electrolytes and solid electrolytes can be used. For example, various ionic liquids in which lithium ions are added, a quasi-solid electrolyte in which an ionic liquid and a fine powder are mixed, and a lithium ion conductive solid electrolyte can be used.

Furthermore, in order to improve charging and discharging cycle characteristics, a compound that promotes stable formation of a coating on the surface of the negative electrode active material can be appropriately contained in the above electrolytic solution. For example, vinylene carbonate (VC), fluorobenzene, cyclic fluorinated carbonate [fluoroethylene carbonate (FEC), trifluoropropylene carbonate (TFPC), etc.], and fluorinated carbonate such as chain fluorinated carbonate [trifluorinated dimethyl carbonate (TFDMC), trifluorodiethyl carbonate (TFDEC), trifluoroethylmethyl carbonate (TFEMC), etc.] are effective. Here, the cyclic fluorinated carbonate and chain fluorinated carbonate can be used as a solvent like ethylene carbonate.

A separator is disposed between a positive electrode plate and a negative electrode plate as described above and thereby a battery structure is formed. Such a battery structure is wound or folded and put into a cylindrical battery case or a rectangular battery case, and an electrolytic solution is then injected, and thereby a lithium ion battery is completed.

In addition, the battery structure is laminated on a bi-cell structure, and the lamination is then impregnated in an organic electrolytic solution, and the obtained product is put into a pouch and sealed to complete a lithium ion polymer battery.

<Improvement in Battery Characteristics According to the Present Invention>

According to the present invention, when the carbonaceous material (a) and the silicon oxide structure (b) are mixed in predetermined proportions, it is possible to maintain various battery characteristics in a well-balanced manner, and it is possible to further improve at least one battery characteristic from a battery capacity and a discharging rate characteristic. Furthermore, in the following specific embodiments, a further improvement in battery characteristics can be expected.

Figure 3:
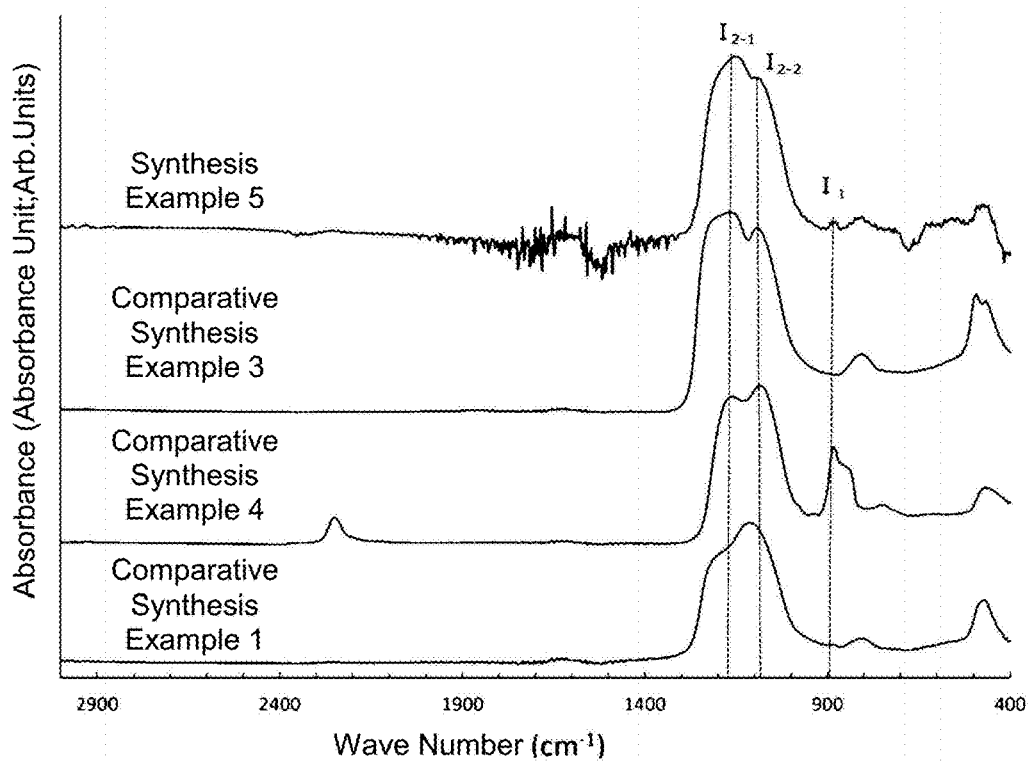
FIG. 3 shows IR absorption spectrum results obtained when infrared spectroscopy (IR) measurement is performed on a silicon nanoparticle-containing hydrogen polysilsesquioxane sintered product (5), a silicon nanoparticle composite silicon oxide (1), a silicon nanoparticle-containing hydrogen polysilsesquioxane sintered product (8), and a silicon nanoparticle-containing hydrogen polysilsesquioxane sintered product (9) produced in Synthesis Example 5 and Comparative Synthesis Examples 1, 3 and 4.

Among silicon oxide structures according to the present invention, in contrast to a general silicon oxide atomic composition of the related art, as shown in FIG. 3, in a spectrum obtained through infrared spectroscopy (IR) measurement, an atomic composition which has a ratio ($I_1/I_2$) between an intensity ($I_1$) of a peak 1 derived from Si—H bonds at 820 to 920 cm$^{-1}$ and an intensity ($I_2$) of a peak 2 derived from Si—O—Si bonds at 1,000 to 1,200 cm$^{-1}$ being in a range of 0.01 to 0.35, and as derived from elemental analysis values in Table 1, and is represented by a general formula $SiO_{x2}H_{y2}$ (0.3<x2<1.5, 0.01<y2<0.35) is particularly preferable. Since a secondary battery (for example, a lithium ion secondary battery and a lithium ion polymer secondary battery) using a silicon oxide structure specified by these parameters secures a particularly large battery capacity and exhibits favorable initial charging and discharging efficiency and cycle characteristics, an embodiment of such a secondary battery is particularly preferable.

In addition, among silicon oxide structures according to the present invention, a structure in which a ratio ($I_{2-1}/I_{2-2}$) between an intensity ($I_{2-1}$) of a peak 2-1 near 1,170 cm$^{-1}$ and an intensity ($I_{2-2}$) of a peak 2-2 near 1,070 cm$^{-1}$ among peaks derived from Si—O—Si bonds exceeds 1 in a spectrum obtained through infrared spectroscopy measurement is particularly preferable. Since a secondary battery (for example, lithium ion secondary battery, lithium ion polymer secondary battery) using a silicon oxide structure specified in such a peak ratio range secures a particularly large battery capacity and exhibits favorable initial charging and discharging efficiency and cycle characteristics, an embodiment of such a secondary battery is particularly preferable. Here, a feature of the peak ratio of the sintered product is the same as the silicon nanoparticle-containing hydrogen polysilsesquioxane as a precursor. That is, since the proportion of cyclic bonds is substantially maintained even if a heat treatment is performed, the silicon nanoparticle-containing hydrogen polysilsesquioxane having the above peak ratio maintains a state of $I_{2-1}/I_{2-2}>1$ even after the heat treatment.

In such a silicon nanoparticle-containing hydrogen polysilsesquioxane sintered product, silicon-based nanoparticles are chemically and firmly bonded (for example, Si—O—Si bond) through a silicon oxide structure derived from hydrogen polysilsesquioxane before a heat treatment. As a result, silicon-based nanoparticles as primary particles form a network structure and the primary particles aggregate to form secondary aggregates. That is, more specifically, the "silicon oxide structure" in the present invention can have a silicon nanoparticle network structure in which silicon-based nanoparticles as primary particles as described above aggregate and additionally, predetermined secondary aggregates (secondary aggregates) are formed.

In the network structure, a part of the silicon oxide structure except for silicon-based nanoparticles (that is, a framework part connecting silicon-based nanoparticles) serves as a buffer layer against expansion and contraction of silicon-based nanoparticles, and as a result, refinement of silicon-based nanoparticles occurring when charging and discharging are repeated is thought to be reduced.

Here, it should be noted that the configuration described in the "silicon nanoparticle-containing hydrogen polysilsesquioxane sintered product" is not limited to only a concept of the "silicon nanoparticle-containing hydrogen polysilsesquioxane sintered product" but it is widely used in the "silicon oxide structure" which is a high-level concept as long as there is no particular contradiction. That is, an embodiment of such a "silicon oxide structure" is also described substantially in this specification.

EXAMPLES

The present invention will be described below in further detail with reference to synthesis examples, comparative synthesis examples, examples and comparative examples, but the present invention is not limited to the examples.

Samples prepared in synthesis examples and comparative synthesis examples were subjected to various analyses and evaluations. Measurement devices/measurement methods for "infrared spectroscopy measurement" and "elemental analysis measurement" in synthesis examples and comparative synthesis examples, and "evaluation of battery characteristics" in examples and comparative examples are as follows.

(Infrared Spectroscopy Measurement)

For infrared spectroscopy measurement, using Nicolet iS5 FT-IR (commercially available from Thermo Fisher Scientific) as an infrared spectroscopic device, in transmission measurement (a resolution of 4 cm$^{-1}$, the number of scans of 16, a data interval of 1.928 cm$^{-1}$, a detector DTGS KBr) according to a KBr method, an intensity ($I_2$) of a peak 2 derived from Si—O—Si bonds at 1,000 to 1,200 cm$^{-1}$ was measured. Here, each peak intensity was measured by connecting a start point and an end point of a target peak with a straight line, partially correcting a baseline, and then measuring a height from the baseline to the peak top. Since there were two peaks derived from Si—O—Si bonds, peak separation was performed, and regarding peak positions, an intensity of a peak near 1,170 cm$^{-1}$ was set as $I_{2-1}$, an intensity of a peak near 1,070 cm$^{-1}$ was set as $I_{2-2}$, and an intensity of a peak which had a higher intensity between two peaks was set as $I_2$.

(Elemental Analysis)

Element composition analysis was performed by an RBS (Rutherford backscattering analysis)/HFS (hydrogen forward scattering analysis) method in which, after a sample powder was solidified in a pellet form, He ions accelerated at 2.3 MeV were applied to the sample, energy spectrums of backscattering particles and energy spectrums of forward scattered hydrogen atoms were analyzed, and thus a composition value with high accuracy including hydrogen was obtained. The measurement device was Pelletron 3 SDH (commercially available from National Electrostatics Corporation), and measurement was performed under conditions; ions of incidence: 2.3 MeV He, RBS/HFS angle of incidence for simultaneous measurement: 75 deg., scattering angle: 160 deg., sample current: 4 nA, and beam diameter: 2 mmφ.

(Observation Under Scanning Electron Microscope)

Measurement was performed at any acceleration voltage using VE-9800 (commercially available from Keyence Corporation) or SU-90 (commercially available from Hitachi High-Technologies Corporation).

(Analysis of Titanium Oxide Coating Layer)

A titanium oxide coating layer was analyzed using an X-ray photoelectron spectroscopic analyzing device PHI Quanera SXM [ULVAC-PHI] with a monochromated AlKα X-ray source, an output of 15 kV/25 W, and a beam diameter of 100 μmφ, and a state of a composite product was specified from peak positions of Ti2p and O1s, and a peak shape.

(Evaluation of Battery Characteristics)

As will be described below, in examples and comparative examples, lithium ion batteries were produced using a predetermined composition for a secondary battery negative electrode (negative electrode active material), a discharging capacity was measured according to a battery cycle test, and a capacity retention rate was calculated. In addition, rate characteristics were also evaluated. Here, measurement of a discharging capacity was as follows.

First, the produced batteries were set in a battery characteristic evaluation device holder in a thermostatic chamber at 20° C. Then, the batteries were left for 24 hours, and awaited until a potential was stabilized. Next, a discharging capacity was measured by the following program and the batteries were evaluated (electron scanning range 0.001 to 1.5 V vs. Li+/Li, CC-CV charging (intercalation and lithiation to a negative electrode) CC discharging (deintercalation and delithiation from a negative electrode)).

(1) Charging 0.05 C→discharging 0.05 C 2 cycles (conditioning, and initial capacity confirmation)
(2) Charging 0.2 C→discharging 0.2 C 10 cycles (rate characteristic evaluation)
(3) Charging 0.2 C→discharging 0.5 C 1 cycle (rate characteristic evaluation)
(4) Charging 0.2 C→discharging 1 C 1 cycle (rate characteristic evaluation)
(5) Charging 0.2 C→discharging 2 C 1 cycle (rate characteristic evaluation)
(6) Capacity discharging (no charging→discharging 0.2 C 1 cycle)
(7) Charging 0.2 C→discharging 0.2 C 1 cycle (rate characteristic evaluation)
(8) charging 0.2 C→discharging 0.2 C 500 cycles (cycle characteristic evaluation)

Synthesis Example 1

(Preparation of Silicon Nanoparticle-Containing Hydrogen Polysilsesquioxane Powder (1))

20 g of pure water and 1.92 g of a silicon nano powder (Sigma-Aldrich, less than 100 nm (volume-based average particle diameter, but exceeded 10 nm)) were put into a 50 ml beaker, and a silicon nanoparticle dispersion aqueous solution was prepared using an ultrasonic washing machine. The silicon fine particle dispersion solution and 2.43 g (24 mmol) of hydrochloric acid with a concentration of 36 mass %, and 218.6 g of pure water were put into a 500 ml three-necked flask, the mixture was stirred at room temperature for 10 minutes, and the silicon-based nanoparticles were dispersed in the whole mixture, and 45 g (274 mmol) of triethoxysilane (commercially available from Tokyo Chemical Industry Co., Ltd.) was added dropwise at 25° C. with stirring. After dropwise addition was completed, a hydrolysis reaction and a condensation reaction occurred at 25° C. for 2 hours with stirring.

After a reaction time elapsed, the reactant was filtered off using a membrane filter (with a pore size of 0.45 μm, hydrophilic), and a solid was collected. The obtained solid was dried under a reduced pressure at 80° C. for 10 hours, and 16.4 g of a silicon nanoparticle-containing hydrogen polysilsesquioxane powder (1) was obtained.

(Preparation of Silicon Nanoparticle-Containing Hydrogen Polysilsesquioxane Sintered Product (1))

10.0 g of the silicon nanoparticle-containing hydrogen polysilsesquioxane powder (1) of Synthesis Example 1 was set in an SSA-S grade alumina boat, and then the boat was set in a vacuum purge type tube furnace KTF43NI-VPS (commercially available from Koyo Thermo Systems Co., Ltd.). As heat treatment conditions, under an argon gas atmosphere (high purity argon gas of 99.999%), argon gas was supplied at a flow rate of 250 ml/min, the temperature was raised at a rate of 4° C./min, and sintering was performed at 900° C. for 1 hour, and thereby a silicon nanoparticle-containing hydrogen polysilsesquioxane sintered product was obtained.

Next, the obtained silicon nanoparticle-containing hydrogen polysilsesquioxane sintered product was disintegrated and crushed in a mortar for 5 minutes and classified using a stainless steel sieve with a sieve opening of 32 μm, and thereby 9.58 g of the silicon nanoparticle-containing hydrogen polysilsesquioxane sintered product (1) with a maximum particle diameter of 32 μm was obtained.

Synthesis Example 2

(Preparation of Silicon Nanoparticle-Containing Hydrogen Polysilsesquioxane Powder (2))

200 g of pure water and 19.2 g of a silicon nano powder (Sigma-Aldrich, less than 100 nm (volume-based average particle diameter, but exceed 10 nm)) were put into a 500 ml beaker, and a silicon nanoparticle dispersion aqueous solution was prepared using an ultrasonic washing machine. In a 3 L separable flask, the silicon nanoparticle dispersion solution, 12.2 g (120 mmol) of hydrochloric acid with a concentration of 36 mass % and 0.94 kg of pure water were stirred for 10 minutes at room temperature, all of the silicon-based nanoparticles were dispersed, and 167 g (1.37 mol) of trimethoxysilane (commercially available from Tokyo Chemical Industry Co., Ltd.) was added dropwise at 25° C. with stirring. After dropwise addition was completed, a hydrolysis reaction and a condensation reaction occurred at 25° C. for 2 hours with stirring.

After a reaction time elapsed, the reactant was filtered off using a membrane filter (with a pore size of 0.45 μm, hydrophilic), and a solid was collected. The obtained solid was dried under a reduced pressure at 80° C. for 10 hours, and 95.2 g of a silicon nanoparticle-containing hydrogen polysilsesquioxane powder (2) was obtained.

(Preparation of Silicon Nanoparticle-Containing Hydrogen Polysilsesquioxane Sintered Product (2))

A silicon nanoparticle-containing hydrogen polysilsesquioxane sintered product (2) was prepared by the same method as in Synthesis Example 1 using the above silicon nanoparticle-containing hydrogen polysilsesquioxane powder (2).

Synthesis Example 3

(Preparation of Silicon Nanoparticle-Containing Hydrogen Polysilsesquioxane Powder (3))

153 g of a silicon nanoparticle-containing hydrogen polysilsesquioxane powder (3) was obtained in the same procedures as in Synthesis Example 2 except that, when a silicon nanoparticle-containing hydrogen polysilsesquioxane was prepared, an amount of a silicon nano powder (Sigma-Aldrich, less than 100 nm (volume-based average particle diameter, but exceeded 10 nm)) prepared was changed to 77.0 g.

Infrared spectroscopic spectrums of the obtained silicon nanoparticle-containing hydrogen polysilsesquioxane powder (3) are shown in FIG. 1, and an SEM image is shown in FIG. 2.

(Preparation of Silicon Nanoparticle-Containing Hydrogen Polysilsesquioxane Sintered Product (3))

A silicon nanoparticle-containing hydrogen polysilsesquioxane sintered product (3) was prepared by the same method as in Synthesis Example 1 using the above silicon nanoparticle-containing hydrogen polysilsesquioxane powder (3).

Synthesis Example 4

(Preparation of Silicon Nanoparticle-Containing Hydrogen Polysilsesquioxane Powder (4))

95.4 g of a silicon nanoparticle-containing hydrogen polysilsesquioxane powder (4) was obtained in the same procedures as in Synthesis Example 3 except that, when a silicon nanoparticle-containing hydrogen polysilsesquioxane was prepared, 7.2 g (120 mmol) of acetic acid (Wako special grade reagent) was used in place of 12.2 g (120 mmol) of hydrochloric acid with a concentration of 36 mass % as a condensation catalyst.

(Preparation of Silicon Nanoparticle-Containing Hydrogen Polysilsesquioxane Sintered Product (4))

A silicon nanoparticle-containing hydrogen polysilsesquioxane sintered product (4) was prepared by the same method as in Synthesis Example 1 using the above silicon nanoparticle-containing hydrogen polysilsesquioxane powder (4).

Synthesis Example 5

(Preparation of Silicon Nanoparticle-Containing Hydrogen Polysilsesquioxane Powder (5))

50 g of pure water and 6.63 g of a silicon nano powder (Sigma-Aldrich, less than 100 nm (volume-based average particle diameter, but exceed 10 nm)) were put into a 100 ml beaker, and a silicon nanoparticle dispersion aqueous solution was prepared using an ultrasonic washing machine. The silicon nanoparticle dispersion solution and 46 g of pure water were put into a 500 ml three-necked flask and stirred for 10 minutes, and then the inside of the flask was replaced with nitrogen. Next, while the flask was cooled with ice, 16.0 g (118 mmol) of trichlorosilane was added dropwise at 20° C. with stirring. After dropwise addition was completed, a hydrolysis reaction and a condensation reaction occurred at 20° C. for 2 hours with stirring.

After a reaction time elapsed, the reactant was filtered off using a membrane filter (with a pore size of 0.45 μm, hydrophilic), and a solid was collected. The obtained solid was dried under a reduced pressure at 80° C. for 10 hours, and 12.6 g of a silicon nanoparticle-containing hydrogen polysilsesquioxane powder (5) was obtained.

(Preparation of Silicon Nanoparticle-Containing Hydrogen Polysilsesquioxane Sintered Product (5))

A silicon nanoparticle-containing hydrogen polysilsesquioxane sintered product (5) was prepared by the same method as in Synthesis Example 1 using the above silicon nanoparticle-containing hydrogen polysilsesquioxane powder (5). Infrared spectroscopic spectrums of the obtained silicon nanoparticle-containing hydrogen polysilsesquioxane sintered product (5) (Example 10) are shown in FIG. 3, and an SEM image is shown in FIG. 4.

Synthesis Example 6

(Preparation of Silicon Nanoparticle-Containing Hydrogen Polysilsesquioxane Sintered Product (6))

9.83 g of a silicon nanoparticle-containing hydrogen polysilsesquioxane sintered product (6) was obtained by the same method as in Synthesis Example 1 except that 10.0 g of the above silicon nanoparticle-containing hydrogen polysilsesquioxane powder (5) was used and a supply gas was an argon and hydrogen mixed gas (hydrogen gas concentration of 10 volume %).

Synthesis Example 7

(Preparation of Silicon Nanoparticle-Containing Hydrogen Polysilsesquioxane Sintered Product (7))

A sintered product was prepared in the same manner as in Synthesis Example 2 except that 10.0 g of the above silicon nanoparticle-containing hydrogen polysilsesquioxane powder (5) was used and a sintering temperature was set to 800° C., and thereby 9.81 g of a silicon nanoparticle-containing hydrogen polysilsesquioxane sintered product (7) was obtained.

Comparative Synthesis Example 1

(Preparation of Silicon Nanoparticle Composite Silicon Oxide (1))

Commercially available silicon monoxide (under 325 mesh commercially available from Aldrich) was classified using a 20 μm stainless steel sieve and thereby silicon monoxide powder particles with a maximum particle diameter of 20 μm were obtained. 10.0 g of the silicon monoxide of 20 μm or less and 6.37 g of a silicon nano powder (Sigma-Aldrich, volume-based average particle diameter<100 nm (less than 100 nm)) were subjected to a ball milling treatment and mixing using a zirconia container and a zirconia ball in a planetary ball mill for 10 minutes, and thereby silicon-based nanoparticles-mixed silicon oxide (1) was obtained. Infrared spectroscopic spectrums of the obtained silicon-based nanoparticles-mixed silicon oxide (1) are shown in FIG. 3 (in FIG. 3, indicated as Comparative Synthesis Example 1). Next, 5 g of an aqueous solution containing 2 mass % of carboxymethyl cellulose was added to the silicon-based nanoparticles-mixed silicon oxide (1), a ball milling treatment was performed in a planetary ball mill for 2 hours using a zirconia container and a zirconia ball, moisture was removed by drying using a vacuum dryer at 100° C. for 8 hours, and a silicon nanoparticle composite silicon oxide (1) was obtained.

Comparative Synthesis Example 2

(Preparation of Hydrogen Silsesquioxane Polymer (1))

12.2 g (120 mmol) of hydrochloric acid with a concentration of 36 mass % and 1.19 kg of pure water were put into a 3 L separable flask, and 167 g (1.37 mol) of trimethoxysilane (commercially available from Tokyo Chemical Industry Co., Ltd.) was added dropwise at 25° C. with stirring. After dropwise addition was completed, a hydrolysis reaction and a condensation reaction occurred at 25° C. for 2 hours with stirring.

After a reaction time elapsed, the reactant was filtered off using a membrane filter (with a pore size of 0.45 μm, hydrophilic), and a solid was collected. The obtained solid was dried under a reduced pressure at 80° C. for 10 hours, and 76.0 g of a hydrogen silsesquioxane polymer (1) was obtained.

Infrared spectroscopic spectrums of the obtained hydrogen silsesquioxane polymer (1) are shown in FIG. 1.

(Preparation of Hydrogen Silsesquioxane Polymer Sintered Product (1))

A hydrogen silsesquioxane polymer sintered product (1) was prepared by the same method as in Synthesis Example 1 using the hydrogen silsesquioxane polymer (1).

Comparative Synthesis Example 3

(Preparation of silicon nanoparticle-containing hydrogen polysilsesquioxane sintered product (8))

A silicon nanoparticle-containing hydrogen polysilsesquioxane sintered product (8) was obtained in the same manner as in Synthesis Example 1 except that a sintering temperature during a heat treatment was set to 1,100° C. when a sintered product was prepared.

Infrared spectroscopic spectrums of the obtained silicon nanoparticle-containing hydrogen polysilsesquioxane sintered product (8) are shown in FIG. 3.

Comparative Synthesis Example 4

(Preparation of Silicon Nanoparticle-Containing Hydrogen Polysilsesquioxane Sintered Product (9))

A silicon nanoparticle-containing hydrogen polysilsesquioxane sintered product (9) was obtained in the same manner as in Synthesis Example 1 except that a sintering temperature during a heat treatment was set to 500° C. when a sintered product was prepared.

Infrared spectroscopic spectrums of the obtained silicon nanoparticle-containing hydrogen polysilsesquioxane sintered product (9) (Comparative Synthesis Example 5) are shown in FIG. 3.

As described above, final products prepared in Synthesis Examples 1 to 7 and Comparative Synthesis Examples 1 to 4 were subjected to elemental analysis through infrared spectroscopy. Results thereof and IR peak ratios are shown in Tables 1 and 2.

TABLE 1

| | | Elemental analysis (molar ratio) | | | IR peak ratio |
|---|---|---|---|---|---|
| | Analysis target | Si | O | H | $I_{2-1}/I_{2-2}$ |
| Synthesis Example 1 | Silicon nanoparticle-containing hydrogen polysilsesquioxane (1) | 1.00 | 1.21 | 0.82 | 1.08 |
| Synthesis Example 2 | Silicon nanoparticle-containing hydrogen polysilsesquioxane (2) | 1.00 | 1.02 | 0.67 | 1.15 |
| Synthesis Example 3 | Silicon nanoparticle-containing hydrogen polysilsesquioxane (3) | 1.00 | 0.50 | 0.32 | 1.22 |
| Synthesis Example 4 | Silicon nanoparticle-containing hydrogen polysilsesquioxane (4) | 1.00 | 0.51 | 0.34 | 1.25 |
| Synthesis Example 5 | Silicon nanoparticle-containing hydrogen polysilsesquioxane (5) | 1.00 | 0.52 | 0.33 | 1.23 |
| Comparative Synthesis Example 1 | Silicon nanoparticle composite silicon oxide (1) | 1.00 | 0.50 | 0.00 | 0.77 |
| Comparative Synthesis Example 2 | Hydrogen silsesquioxane polymer (1) | 1.00 | 1.51 | 1.01 | 0.84 |

TABLE 2

| | | Sintering temperature | Elemental analysis (molar ratio) | | | IR peak ratio | |
|---|---|---|---|---|---|---|---|
| | Analysis target | ° C. | Si | O | H | $I_1/I_2$ | $I_{2-1}/I_{2-2}$ |
| Synthesis Example 1 | Silicon nanoparticle-containing hydrogen polysilsesquioxane sintered product (1) | 900 | 1.00 | 1.22 | 0.08 | 0.05 | 1.2 |
| Synthesis Example 2 | Silicon nanoparticle-containing hydrogen polysilsesquioxane sintered product (2) | 900 | 1.00 | 1.03 | 0.09 | 0.06 | 1.15 |
| Synthesis Example 3 | Silicon nanoparticle-containing hydrogen polysilsesquioxane sintered product (3) | 900 | 1.00 | 0.50 | 0.10 | 0.05 | 1.18 |
| Synthesis Example 4 | Silicon nanoparticle-containing hydrogen polysilsesquioxane sintered product (4) | 900 | 1.00 | 0.51 | 0.08 | 0.07 | 1.20 |
| Synthesis Example 5 | Silicon nanoparticle-containing hydrogen polysilsesquioxane sintered product (5) | 900 | 1.00 | 0.52 | 0.07 | 0.04 | 1.15 |
| Synthesis Example 6 | Silicon nanoparticle-containing hydrogen polysilsesquioxane sintered product (6) | 900 | 1.00 | 0.50 | 0.12 | 0.06 | 1.17 |

TABLE 2-continued

| | Analysis target | Sintering temperature °C. | Elemental analysis (molar ratio) | | | IR peak ratio | |
|---|---|---|---|---|---|---|---|
| | | | Si | O | H | $I_1/I_2$ | $I_{2-1}/I_{2-2}$ |
| Synthesis Example 7 | Silicon nanoparticle-containing hydrogen polysilsesquioxane sintered product (7) | 800 | 1.00 | 0.51 | 0.15 | 0.13 | 1.10 |
| Comparative Synthesis Example 1 | Silicon nanoparticle composite silicon oxide (1) | — | 1.00 | 0.50 | 0 | 0.00 | 0.77 |
| Comparative Synthesis Example 2 | Hydrogen silsesquioxane polymer sintered product (1) | 900 | 1.00 | 1.51 | 0.05 | 0.04 | 0.68 |
| Comparative Synthesis Example 3 | Silicon nanoparticle-containing hydrogen polysilsesquioxane sintered product (8) | 1,100 | 1.00 | 0.51 | 0 | 0.00 | 1.14 |
| Comparative Synthesis Example 4 | Silicon nanoparticle-containing hydrogen polysilsesquioxane sintered product (9) | 500 | 1.00 | 0.50 | 0.45 | 0.45 | 1.01 |

[Results]

According to results of the above synthesis examples and comparative synthesis examples, it is thought that the silicon nanoparticle-containing hydrogen polysilsesquioxanes obtained in the synthesis examples and sintered products (1) to (7) thereof had predetermined atomic compositions of the present invention containing silicon (Si), oxygen (O) and hydrogen (H), and the silicon nanoparticle-containing hydrogen polysilsesquioxanes (1) to (7) obtained in the synthesis examples had a predetermined amount of Si—H bonds. That is, it is inferred that there was a chemical bond between the surface of silicon-based nanoparticles and a hydrogen polysilsesquioxane, and it is thought that this chemical bond remained between the surface of silicon-based nanoparticles and the hydrogen polysilsesquioxane-derived silicon oxide structure in such sintered products.

Here, the inventors produced lithium ion secondary batteries using silicon nanoparticle-containing hydrogen polysilsesquioxane sintered products (1) to (7) alone as negative electrode materials without being combined with a predetermined carbonaceous material of the present invention and performed battery characteristic tests for these secondary batteries. As a result, it was confirmed that, regarding a discharging capacity, both an initial discharging capacity and a discharging capacity of the 50th cycle were significantly higher than those of a carbon-based negative electrode active material of the related art, and additionally, a favorable initial charging and discharging efficiency was secured, decrease in the capacity according to charging and discharging cycles was small, and a high capacity retention rate was maintained.

On the other hand, as can be understood from the results in Tables 1 and 2, the silicon nanoparticle composite silicon oxide (1) of Comparative Synthesis Example 1 did not contain hydrogen in its atomic composition, and the surface of silicon-based nanoparticles did not have a chemical bond, and did not have a Si—H bond. The inventors produced lithium ion secondary batteries using the silicon nanoparticle composite silicon oxide (1) as a negative electrode active material, and performed battery characteristic tests for these secondary batteries. As a result, it was confirmed that initial charging and discharging efficiency showed a certain level of value, but a sharp decrease in the capacity was observed, and a practical level for a secondary battery was not reached.

Comparative Synthesis Example 2 corresponded to a sintered product of a hydrogen polysilsesquioxane not containing silicon-based nanoparticles (hydrogen silsesquioxane polymer sintered product (1)). Among peaks derived from Si—O—Si bonds in infrared absorption spectrums, a ratio ($I_{2-1}/I_{2-2}$) between an intensity ($I_{2-1}$) of a peak 2-1 near 1,170 cm$^{-1}$ and an intensity ($I_{2-2}$) of a peak 2-2 near 1,070 cm$^{-1}$ did not exceed 1. A new structure having chemical bonds between the surface of silicon-based nanoparticles and the hydrogen polysilsesquioxane-derived silicon oxide structure as seen in the synthesis example was not obtained. The inventors produced negative electrodes and lithium secondary batteries using a negative electrode active material produced from a silicon oxide having no chemical bond with the surface of such silicon-based nanoparticles, and evaluated battery characteristics. As a result, it was confirmed that, as in the silicon nanoparticle composite silicon oxide (1) of Comparative Synthesis Example 1, initial charging and discharging efficiency showed a certain level of value, but a sharp decrease in the capacity was obtained, and a practical level for a lithium ion battery was not reached.

In addition, it can be understood that the silicon nanoparticle-containing hydrogen polysilsesquioxane sintered product sintered at a temperature of higher than 1,000° C. as in Comparative Synthesis Example 3 had no hydrogen in its atomic composition, and did not contain an appropriate amount of Si—H bonds at all. On the other hand, in the silicon nanoparticle-containing hydrogen polysilsesquioxane sintered product (9) produced at a low sintering temperature in Comparative Synthesis Example 4, there was an excess amount of Si—H bonds.

The inventors confirmed that, regarding characteristics of lithium secondary batteries using a negative electrode produced from sintered products of Comparative Synthesis Examples 3 and 4, cycle characteristics were favorable, but an initial discharging capacity was very small, and the practicality was low.

In the present invention, the silicon nanoparticle-containing hydrogen polysilsesquioxane sintered product which exhibited relatively favorable battery performance without being combined with a carbonaceous material can be used as a silicon oxide structure. Thus, as shown in the following examples, when such sintered products and a carbonaceous material are combined in predetermined proportions, it is possible to further improve at least one battery characteristic from a battery capacity and a discharging rate characteristic in secondary batteries.

Next, an example in which a silicon nanoparticle-containing hydrogen polysilsesquioxane sintered product is composited with a titanium oxide will be described.

Synthesis Example 8

(Titanium Oxide Coating Formation Treatment)
9.5 g of the silicon nanoparticle-containing hydrogen polysilsesquioxane sintered product (1) obtained in Synthesis Example 1 was put into a 200 ml eggplant flask containing 45 ml of Ethanol (Wako Pure Chemical Industries, Ltd.: special grade reagent), and a dispersion treatment was performed using an ultrasonic cleaner for 3 minutes and a magnetic stirrer for 5 minutes. After the dispersion treatment, 1.78 g of tetraisopropoxytitanium (AlfaAesar 95% reagent) was added dropwise with stirring, and stirring continued for 1.5 hours at room temperature. After 1.5 hours, stirring was stopped and the solvent was concentrated using an evaporator. When the solvent was evaporated, it was transferred to a vacuum dryer for each flask, and heated and dried under a reduced pressure for 1 hour at 60° C., and a silicon nanoparticle-containing hydrogen polysilsesquioxane sintered product-titanium oxide composite precursor powder (1) was collected.

(Preparation of Silicon Nanoparticle-Containing Hydrogen Polysilsesquioxane Sintered Product-Titanium Oxide Composite (1))
The collected silicon nanoparticle-containing hydrogen polysilsesquioxane sintered product-titanium oxide composite precursor powder (1) was set in a vacuum purge type tube furnace KTF43N1-VPS as in the same manner when the silicon oxide was prepared, and as heat treatment conditions, under an argon gas atmosphere, argon gas was supplied at a flow rate of 250 ml/min, the temperature was raised at a rate of 4° C./min, and sintering was performed at 400° C. for 1 hour. Next, crushing was performed using a mortar, and classification was performed using a stainless steel sieve, and 9.8 g of a powdered silicon nanoparticle-containing hydrogen polysilsesquioxane sintered product-titanium oxide composite (1) with a maximum particle diameter of 32 μm was obtained.

Figure 5:
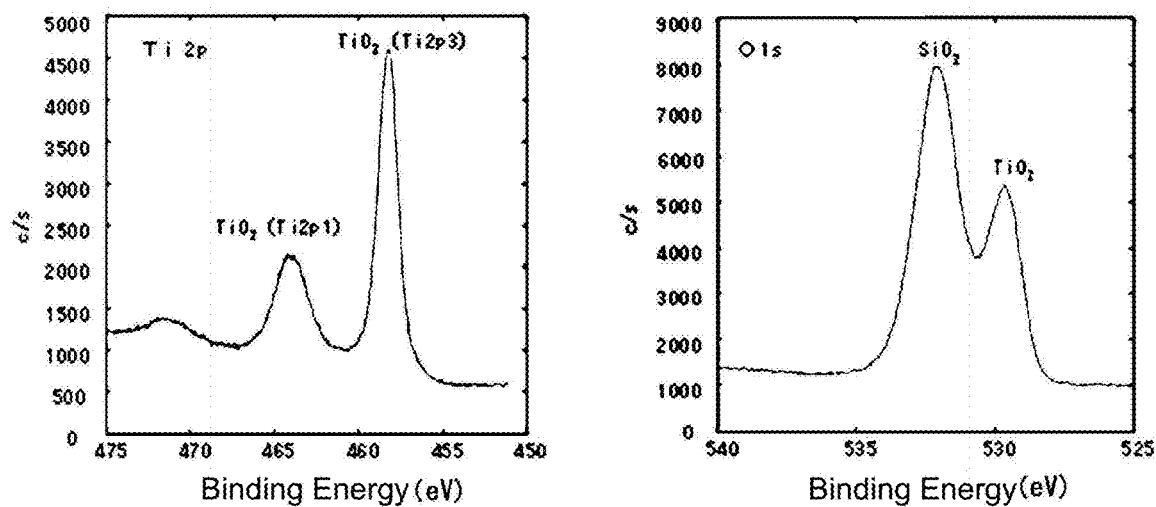
FIG. 5 shows X-ray photoelectron spectroscopic analysis spectrum of a silicon nanoparticle-containing hydrogen polysilsesquioxane sintered product-titanium oxide composite (1) obtained in Synthesis Example 8.

Surface analysis was performed using an X-ray photoelectron spectrometer in order to check a chemical state of titanium in the obtained silicon nanoparticle-containing hydrogen polysilsesquioxane sintered product-titanium oxide composite (1). As a result, it was confirmed that titanium as a titanium oxide was bonded to the surface. X-ray photoelectron spectroscopic analysis Ti2p and O1s spectrums are shown in FIG. 5.

Synthesis Example 9

(Preparation of Silicon Nanoparticle-Containing Hydrogen Polysilsesquioxane Sintered Product-Titanium Oxide Composite (2))
A titanium oxide coating treatment and a heat treatment were performed in the same manner as in Synthesis Example 8 except that the silicon nanoparticle-containing hydrogen polysilsesquioxane sintered product (2) obtained in Synthesis Example 2 was used, and thereby a silicon nanoparticle-containing hydrogen polysilsesquioxane sintered product-titanium oxide composite (2) was obtained.

Synthesis Example 10

(Preparation of Silicon Nanoparticle-Containing Hydrogen Polysilsesquioxane Sintered Product-Titanium Oxide Composite (3))
A titanium oxide coating treatment and a heat treatment were performed in the same manner as in Synthesis Example 8 except that the silicon nanoparticle-containing hydrogen polysilsesquioxane sintered product (3) obtained in Synthesis Example 3 was used, and thereby a silicon nanoparticle-containing hydrogen polysilsesquioxane sintered product-titanium oxide composite (3) was obtained.

Synthesis Example 11

(Production of Silicon Nanoparticle-Containing Hydrogen Polysilsesquioxane Sintered Product-Titanium Oxide Composite (4))
A coating treatment and a heat treatment were performed in the same procedures as in Synthesis Example 8 except that the silicon nanoparticle-containing hydrogen polysilsesquioxane powder (3) obtained in Synthesis Example 3 was used, and an amount of tetraisopropoxytitanium (AlfaAesar 95% reagent) prepared was changed to 0.87 g, and thereby a silicon nanoparticle-containing hydrogen polysilsesquioxane sintered product-titanium oxide composite (4) was obtained.

Figure 6:
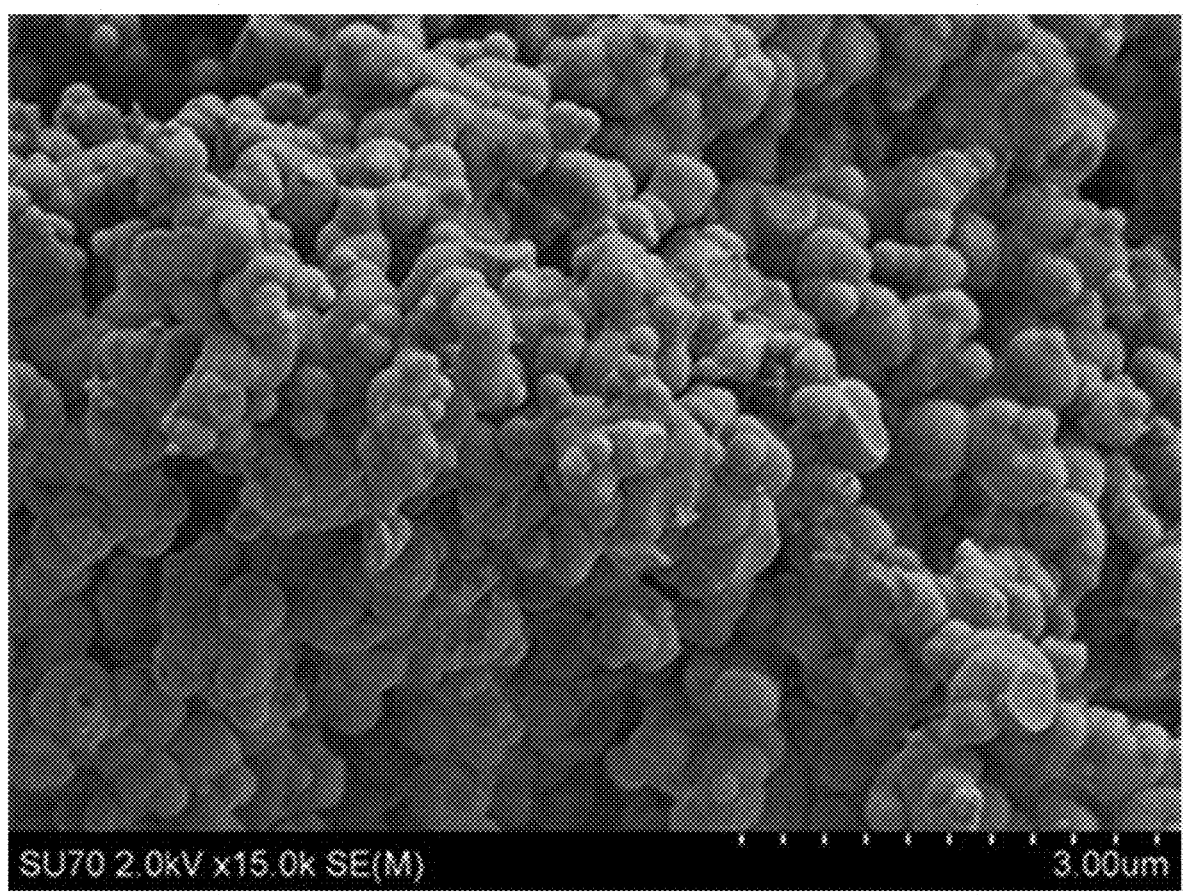
FIG. 6 shows an SEM image of a silicon nanoparticle-containing hydrogen polysilsesquioxane sintered product-titanium oxide composite (4) obtained in Synthesis Example 11.

An SEM image of the obtained silicon nanoparticle-containing hydrogen polysilsesquioxane sintered product-titanium oxide composite (4) is shown in FIG. 6.

Synthesis Example 12

(Production of Silicon Nanoparticle-Containing Hydrogen Polysilsesquioxane Sintered Product-Titanium Oxide Composite (5))
A coating treatment and a heat treatment were performed in the same procedures as in Synthesis Example 8 except that the silicon nanoparticle-containing hydrogen polysilsesquioxane powder (3) obtained in Synthesis Example 3 was used, and an amount of tetraisopropoxytitanium (AlfaAesar 95% reagent) prepared was changed to 2.54 g, and thereby a silicon nanoparticle-containing hydrogen polysilsesquioxane sintered product-titanium oxide composite (5) was obtained.

Synthesis Example 13

(Preparation of Silicon Nanoparticle-Containing Hydrogen Polysilsesquioxane Powder (10))
A silicon nanoparticle-containing hydrogen polysilsesquioxane powder (10) was prepared in the same procedures as in Synthesis Example 2 except that an amount of trimethoxysilane (commercially available from Tokyo Chemical Industry Co., Ltd.) added dropwise was changed to 23.9 g when a silicon nanoparticle-containing hydrogen polysilsesquioxane was prepared.

(Preparation of Silicon Nanoparticle-Containing Hydrogen Polysilsesquioxane Sintered Product (10))
A silicon nanoparticle-containing hydrogen polysilsesquioxane sintered product (10) was prepared by the same method as in Synthesis Example 1 using the obtained silicon nanoparticle-containing hydrogen polysilsesquioxane powder (10).

(Preparation of Silicon Nanoparticle-Containing Hydrogen Polysilsesquioxane Sintered Product-Titanium Oxide Composite (6))

A titanium oxide coating treatment and a heat treatment were performed in the same manner as in Synthesis Example 1 using the obtained silicon nanoparticle-containing hydrogen polysilsesquioxane sintered product (10), and thereby a silicon nanoparticle-containing hydrogen polysilsesquioxane sintered product-titanium oxide composite (6) was obtained.

Comparative Synthesis Example 5

(Preparation of Silicon Nanoparticle-Containing Hydrogen Polysilsesquioxane Sintered Product (11))

A silicon nanoparticle-containing hydrogen polysilsesquioxane sintered product (11) was obtained in the same procedures as in Synthesis Example 1 except that the silicon nanoparticle-containing hydrogen polysilsesquioxane powder (3) obtained in Synthesis Example 3 was used, and a sintering temperature during a heat treatment was set to 1,100° C. when a silicon nanoparticle-containing hydrogen polysilsesquioxane sintered product was prepared.

(Production of Silicon Nanoparticle-Containing Hydrogen Polysilsesquioxane Sintered Product-Titanium Oxide Composite (7))

A titanium oxide coating treatment and a heat treatment were performed in the same manner as in Synthesis Example 8 using the obtained silicon nanoparticle-containing hydrogen polysilsesquioxane sintered product (11), and thereby a silicon nanoparticle-containing hydrogen polysilsesquioxane sintered product-titanium oxide composite (7) was obtained.

Comparative Synthesis Example 6

(Preparation of Silicon Nanoparticle-Containing Hydrogen Polysilsesquioxane Sintered Product (12))

A silicon nanoparticle-containing hydrogen polysilsesquioxane sintered product (12) was obtained in the same procedures as in Synthesis Example 1 except that the silicon nanoparticle-containing hydrogen polysilsesquioxane powder (3) obtained in Synthesis Example 3 was used, and a sintering temperature during a heat treatment was set to 500° C. when a silicon nanoparticle-containing hydrogen polysilsesquioxane sintered product was prepared.

(Production of Silicon Nanoparticle-Containing Hydrogen Polysilsesquioxane Sintered Product-Titanium Oxide Composite (8))

A titanium oxide coating treatment and a heat treatment were performed in the same manner as in Synthesis Example 8 using the obtained silicon nanoparticle-containing hydrogen polysilsesquioxane sintered product (8), and thereby a silicon nanoparticle-containing hydrogen polysilsesquioxane sintered product-titanium oxide composite (8) was obtained.

Comparative Synthesis Example 7

As silicon oxide, commercially available silicon monoxide (under325mesh commercially available from Aldrich) was classified using a 32 μm stainless steel sieve and thereby silicon monoxide powder particles with a maximum particle diameter of 32 μm were used.

Infrared spectroscopic measurement results of silicon monoxide used and elemental analysis results are shown in Table 1. A titanium oxide coating was performed in the same manner as in Synthesis Example 8 except that the silicon monoxide was used in place of the silicon nanoparticle-containing hydrogen polysilsesquioxane sintered product (1).

Table 3 shows results of elemental analysis of Synthesis Examples 8 to 13 and Comparative Synthesis Examples 5 to 7.

TABLE 3

| | Analysis target | Heat treatment temperature ° C. | Silicon oxide Element analysis (molar ratio) | | | IR peak ratio | | TiO$_2$ amount wt % |
|---|---|---|---|---|---|---|---|---|
| | | | Si | O | H | $I_1/I_2$ | $I_{2-1}/I_{2-2}$ | |
| Synthesis Example 8 | Silicon nanoparticle-containing hydrogen polysilsesquioxane sintered product-titanium oxide composite (1) | 900 | 1.00 | 1.22 | 0.08 | 0.05 | 1.12 | 4.9 |
| Synthesis Example 9 | Silicon nanoparticle-containing hydrogen polysilsesquioxane sintered product-titanium oxide composite (2) | 900 | 1.00 | 1.03 | 0.09 | 0.06 | 1.15 | 5.0 |
| Synthesis Example 10 | Silicon nanoparticle-containing hydrogen polysilsesquioxane sintered product-titanium oxide composite (3) | 900 | 1.00 | 0.50 | 0.10 | 0.05 | 1.18 | 5.1 |

TABLE 3-continued

| Analysis target | | Heat treatment temperature ° C. | Silicon oxide Element analysis (molar ratio) | | | IR peak ratio | | TiO$_2$ amount wt % |
|---|---|---|---|---|---|---|---|---|
| | | | Si | O | H | $I_1/I_2$ | $I_{2-1}/I_{2-2}$ | |
| Synthesis Example 11 | Silicon nanoparticle-containing hydrogen polysilsesquioxane sintered product-titanium oxide composite (4) | 900 | 1.00 | 0.50 | 0.10 | 0.05 | 1.18 | 2.5 |
| Synthesis Example 12 | Silicon nanoparticle-containing hydrogen polysilsesquioxane sintered product-titanium oxide composite (5) | 900 | 1.00 | 0.50 | 0.10 | 0.05 | 1.18 | 6.9 |
| Synthesis Example 13 | Silicon nanoparticle-containing hydrogen polysilsesquioxane sintered product-titanium oxide composite (6) | 900 | 1.00 | 0.20 | 0.06 | 0.06 | 1.3 | 4.8 |
| Comparative Synthesis Example 5 | Silicon nanoparticle-containing hydrogen polysilsesquioxane sintered product-titanium oxide composite (7) | 1,100 | 1.00 | 0.51 | 0.00 | 0 | 1.14 | 5.0 |
| Comparative Synthesis Example 6 | Silicon nanoparticle-containing hydrogen polysilsesquioxane sintered product-titanium oxide composite (8) | 500 | 1.00 | 0.50 | 0.45 | 0.45 | 1.01 | 5.0 |
| Comparative Synthesis Example 7 | Titanium oxide-coated silicon monoxide | 900 | 1.00 | 1.05 | 0 | 0 | 0.77 | 5.2 |

[Results]

According to the above elemental analysis results, it can be clearly understood that the silicon nanoparticle-containing hydrogen polysilsesquioxane sintered products subjected to a titanium oxide coating/compositing treatment in Synthesis Examples 8 to 13 had a predetermined amount of Si—H bonds, and a silicon oxide structure had a new structure having a chemical bond between the surface of silicon-based nanoparticles and a hydrogen polysilsesquioxane-derived silicon oxide structure. The inventors confirmed that, even if such a silicon oxide structure alone was used as a negative electrode material without being combined with a predetermined carbonaceous material of the present invention, improvement in battery performance was observed. Specifically, both an initial capacity and a discharging capacity of the 100th cycle were higher than those of a carbon-based negative electrode active material of the related art. However, there was almost no decrease in the capacity, a high capacity retention rate was obtained, that is, charging and discharging cycle deterioration was significantly reduced, favorable cycle characteristics were obtained, and thus it was good enough for practical use.

On the other hand, in Comparative Synthesis Example 5, as can be understood from the elemental analysis results shown in Table 3, since the silicon nanoparticle-containing hydrogen polysilsesquioxane powder was sintered at a temperature of higher than 1,000° C., the obtained silicon nanoparticle-containing hydrogen polysilsesquioxane sintered product did not contain an appropriate amount of Si—H bonds. In addition, in Comparative Synthesis Example 6, since the silicon nanoparticle-containing hydrogen polysilsesquioxane powder was sintered at a low temperature of 500° C., the obtained silicon nanoparticle-containing hydrogen polysilsesquioxane sintered product contained an excessive amount of Si—H bonds.

The inventors confirmed that, regarding characteristics of batteries using a negative electrode produced from such sintered products, cycle characteristics were favorable, but an initial discharging capacity was very small, and the practicality was low.

In addition, in Comparative Synthesis Example 7, although it was coated with a titanium oxide, as can be clearly understood from the elemental analysis results, silicon oxide containing no hydrogen was used as a base material.

The inventors confirmed that, when a negative electrode using titanium oxide-coated silicon oxide of Comparative Synthesis Example 7 as a negative electrode active material was used, regarding battery characteristics, it was a negative electrode active material through which, although an initial discharging capacity showed a certain level of value, it did not exhibit battery characteristics as in batteries of the related art such as showing a sharp decrease in the capacity and additionally, a capacity was lower than that of the case of using a carbon-based negative electrode active material.

In a specific embodiment of the present invention, a titanium-coated/composited silicon nanoparticle-containing hydrogen polysilsesquioxane sintered product exhibiting relatively favorable battery performance without being combined with a carbonaceous material basically can be used as a silicon oxide structure. According to such an embodiment, as shown in the following examples, when such a sintered product and a carbonaceous material can be combined in predetermined proportions, it is possible to further improve at least one battery characteristic from a battery capacity and a discharging rate characteristic in secondary batteries. Next, examples of the present invention are as follows.

Example 1

Figure 11:
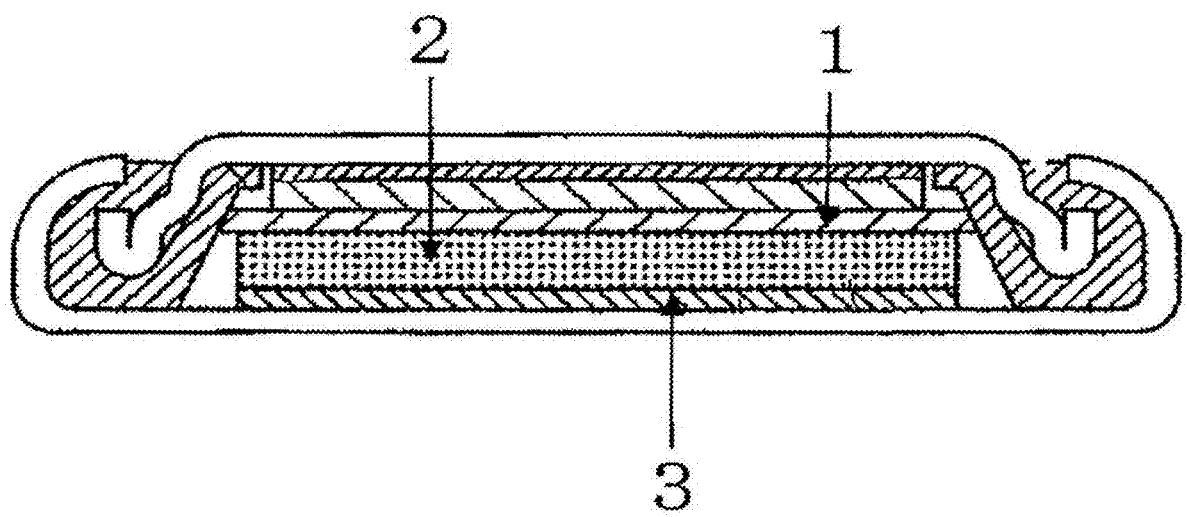
FIG. 11 is a diagram showing a configuration example of a coin type lithium ion battery.

(CGB-10:SiOx=2:8)
(Production of Negative Electrode)
6 g of a 2 mass % carboxymethyl cellulose aqueous solution was put into a screw tube, 0.12 g of acetylene black was additionally added to the aqueous solution, and the mixture was mixed using a kneader at 2,000 rpm for 3 minutes. Next, 0.96 g of a negative electrode active material obtained by mixing the silicon nanoparticle-containing hydrogen polysilsesquioxane sintered product obtained in Synthesis Example 3 and natural graphite (CGB-10: spherical particles with a diameter of about 10 μm commercially available from Nippon Graphite Industry Co., Ltd.) at a mass ratio of 2:8 was added thereto and the mixture was mixed using a kneader at 2,000 rpm for 10 minutes. In addition, a stirrer was put into a screw tube, and stirring was performed at 1,000 rpm for 4 hours. After stirring was completed, mixing was additionally performed using a kneader at 2,000 rpm for 10 minutes. The obtained slurry was applied onto a copper foil using a coating machine (applicator setting 150 μm, electrode density of 0.7 g/cm2). The coated electrode was dried on a hot plate at 80° C. for 30 minutes, and the electrode was pressed using a roll press machine (roll press setting 20 μm). The electrode sheet obtained in this manner was punched using a punching machine at φ 14.5 mm. The punched electrode was vacuum-dried in a glass tube oven at 80° C. overnight, and thereby a negative electrode for a lithium secondary battery was completed.
(Production of Negative Electrode)
(Production of Coin Half Cell CR2032 Type Lithium Ion Secondary Battery)
Using the negative electrode produced as described above, a coin half cell CR2032 type lithium ion secondary battery having a structure shown in FIG. 11 was produced. Production procedures are as follows.
First, a LI foil was punched at φ 15 MM using a punching machine, the punched LI foil was placed on a cell case, and 45 ML of an electrolytic solution (ethylene carbonate:diethyl carbonate=1:1 (containing 1 MOL/L lithium hexafluorophosphate as an electrolyte and 5 mass % fluoroethylene carbonate as an additive)) was added dropwise thereinto. A separator (cell guard: φ17 MM) and a glass filter (GA-100: φ16 MM) were placed in order on the dropwise-added electrolytic solution, 150 ml of an electrolytic solution was added dropwise again from above, and the produced negative electrode was placed thereon. A cell case cap was placed thereon and caulked using a caulking machine, and thereby a lithium ion secondary battery was completed. The produced battery was washed with acetone and pure water.

(Evaluation of Battery Characteristics)
Next, battery characteristics of the produced lithium ion secondary batteries were evaluated based on the above methods.

Example 2

(CGB-10:SiOx=5:5)
A negative electrode and a lithium ion secondary battery were produced in the same procedures as in Example 1 except that a mixing ratio between the silicon nanoparticle-containing hydrogen polysilsesquioxane sintered product and natural graphite was 5:5, and battery characteristics were evaluated.

Example 3

(CGB-10:SiOx=8:2)
A negative electrode and a lithium ion secondary battery were produced in the same procedures as in Example 1 except that a mixing ratio between the silicon nanoparticle-containing hydrogen polysilsesquioxane sintered product and natural graphite was 8:2, and battery characteristics were evaluated.

Example 4

(CGB-10:SiOx—$TiO_2$=2:8)
A negative electrode and a lithium ion secondary battery were produced in the same procedures as in Example 1 except that the titanium oxide-composited silicon nanoparticle-containing hydrogen polysilsesquioxane sintered product obtained in Synthesis Example 10 was used in place of the silicon nanoparticle-containing hydrogen polysilsesquioxane sintered product obtained in Synthesis Example 3, and a mixing ratio between the sintered product and natural graphite was 2:8, and battery characteristics were evaluated.

Example 5

(CGB-10:SiOx—$TiO_2$=8:2)
A negative electrode and a lithium ion secondary battery were produced in the same procedures as in Example 4 except that a mixing ratio between the titanium oxide-composited silicon nanoparticle-containing hydrogen polysilsesquioxane sintered product and natural graphite was changed to 8:2, and battery characteristics were evaluated.

Comparative Example 1

(CGB-10)
A negative electrode and a lithium ion secondary battery were produced in the same procedures as in Example 1 except that the silicon nanoparticle-containing hydrogen polysilsesquioxane sintered product was not added as a negative electrode active material, and only natural graphite was used, and battery characteristics were evaluated.

Comparative Example 2

(SiOx)
A negative electrode and a lithium ion secondary battery were produced in the same procedures as in Example 1 except that natural graphite was not added as a negative electrode active material, and only the silicon nanoparticle-containing hydrogen polysilsesquioxane sintered product was used, and battery characteristics were evaluated.

Comparative Example 3

(SiOx—TiO$_2$)

A negative electrode and a lithium ion secondary battery were produced in the same procedures as in Example 4 except that natural graphite was not added as a negative electrode active material, and only the titanium oxide-composited silicon nanoparticle-containing hydrogen polysilsesquioxane sintered product was used, and battery characteristics were evaluated.

Figure 7:
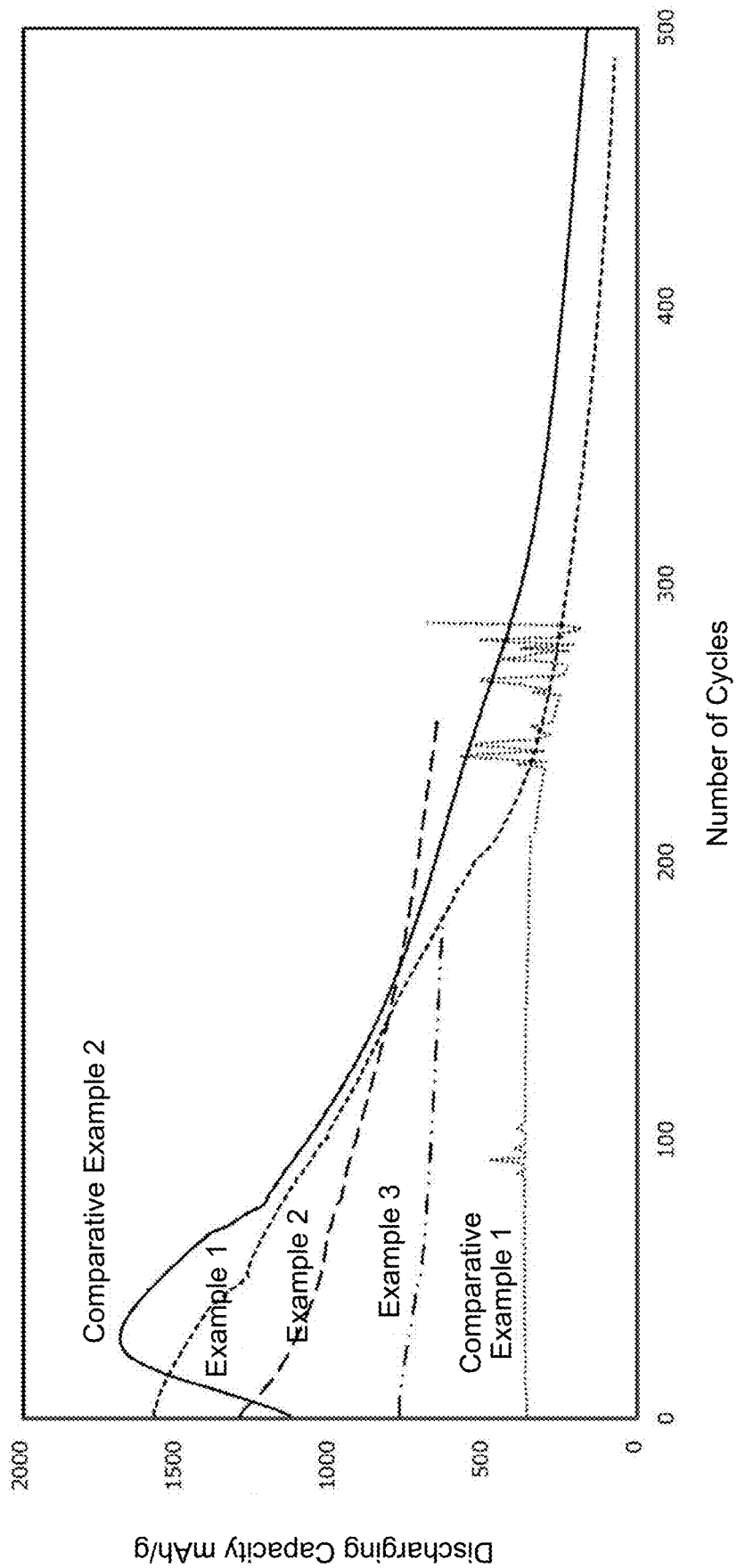
FIG. 7 is a diagram showing results of cycle tests for lithium ion secondary batteries produced in Examples 1 to 3 and Comparative Examples 1 and 2.
Figure 8:
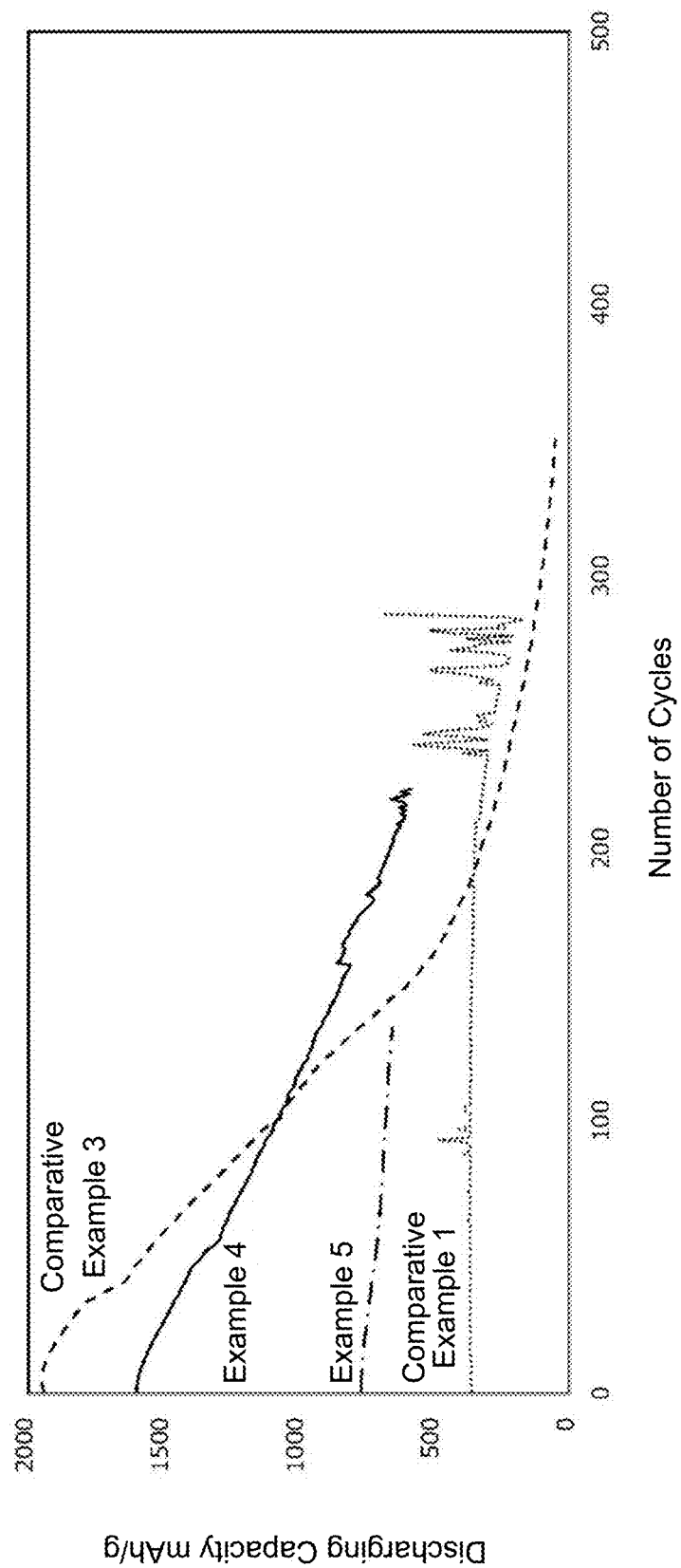
FIG. 8 is a diagram showing results of cycle tests for lithium ion secondary batteries produced in Examples 4 and 5 and Comparative Examples 1 and 3.
Figure 9:
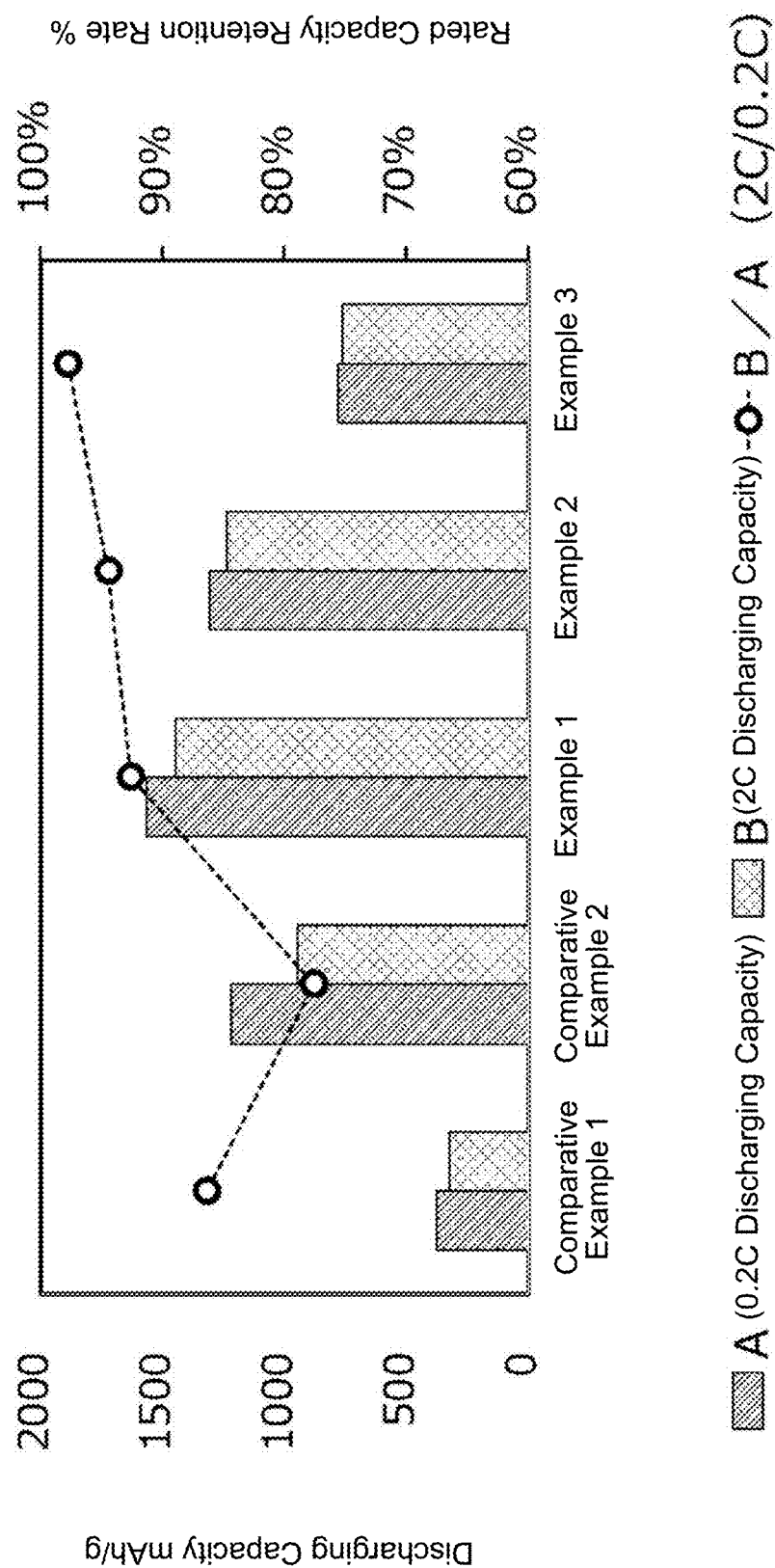
FIG. 9 is a diagram showing a discharging capacity and a rated capacity retention rate measured using lithium ion secondary batteries produced in Examples 1 to 3 and Comparative Examples 1 and 2.
Figure 10:
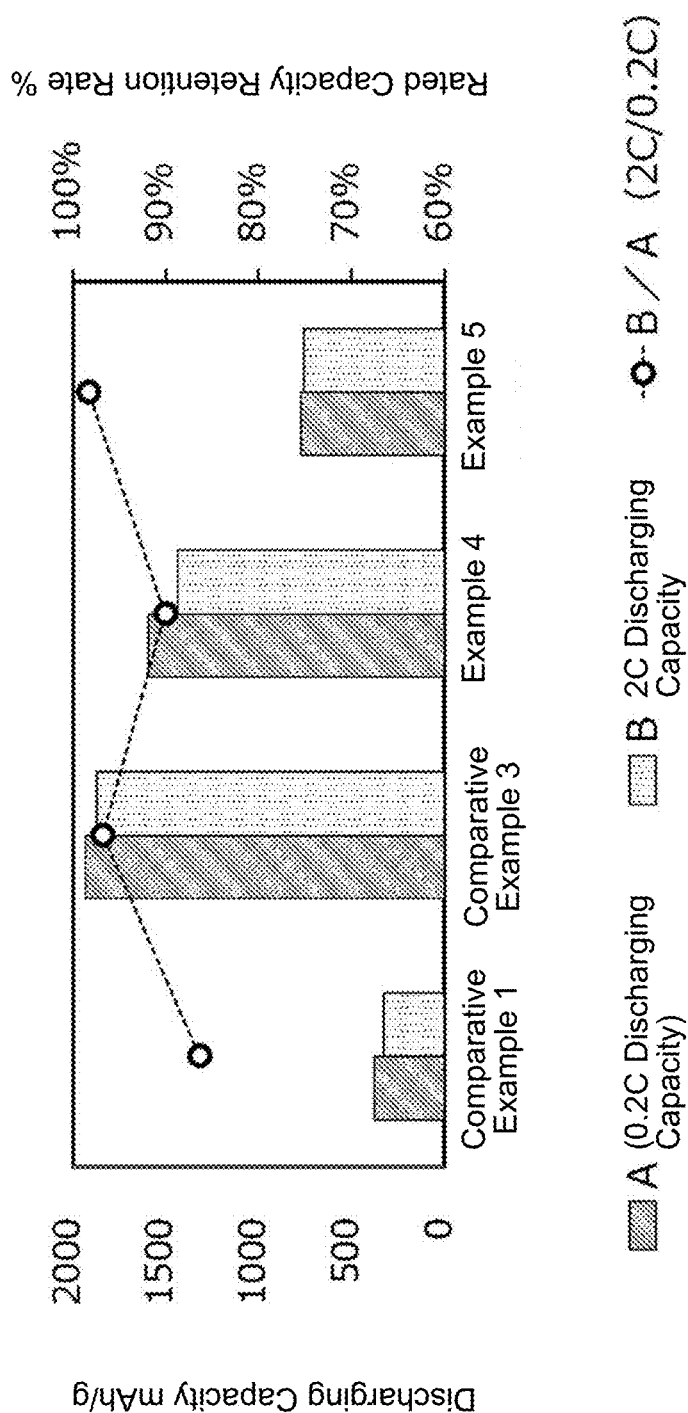
FIG. 10 is a diagram showing a discharging capacity and a rated capacity retention rate measured using lithium ion secondary batteries produced in Examples 4 and 5 and Comparative Examples 1 and 3.

Battery characteristic evaluation results of Examples 1 to 5 and Comparative Examples 1 to 3 are shown in the following Tables 4 and 5. Regarding these batteries of examples and comparative examples, graphs showing the relationship between the number of cycles and the discharging capacity (mAh/g) are shown in FIGS. 7 and 8, and graphs in which the discharging capacity (mAh/g) and the rated capacity retention rate (%) are plotted are shown in FIGS. 9 and 10.

TABLE 4

|  | Mixing ratio (graphite:silicon oxide structure) | Discharging capacity of first cycle (mAh/g) | Discharging capacity of 100$^{th}$ cycle (mAh/g) | Capacity retention rate | 0.2 C discharging capacity | 2 C discharging capacity | 2 C/0.2 C |
| --- | --- | --- | --- | --- | --- | --- | --- |
| Example 1 | 2:8 | 1,573 | 1,022 | 65% | 1,564 | 1,448 | 93% |
| Example 2 | 5:5 | 1,294 | 918 | 71% | 1,308 | 1,236 | 94% |
| Example 3 | 8:2 | 775 | 672 | 87% | 779 | 761 | 98% |
| Comparative Example 1 | 10:0 | 361 | 367 | 101% | 375 | 324 | 86% |
| Comparative Example 2 | 0:10 | 1,134 | 1,075 | 95% | 1,218 | 946 | 78% |

TABLE 5

|  | Mixing ratio (graphite:silicon oxide structure/TiO$_2$) | Discharging capacity of first cycle (mAh/g) | Discharging capacity of 100$^{th}$ cycle (mAh/g) | Capacity retention rate | 0.2 C discharging capacity | 2 C discharging capacity | 2 C/0.2 C |
| --- | --- | --- | --- | --- | --- | --- | --- |
| Example 4 | 2:8 | 1,599 | 1,084 | 68% | 1,591 | 1,433 | 90% |
| Example 5 | 8:2 | 769 | 680 | 88% | 769 | 756 | 98% |
| Comparative Example 1 | 10:0 | 361 | 367 | 101% | 375 | 324 | 86% |
| Comparative Example 3 | 0:10 | 1,944 | 1,100 | 57% | 1,934 | 1,871 | 97% |

[Results]

In Examples 1 to 3 in which a predetermined silicon nanoparticle-containing hydrogen polysilsesquioxane sintered product as a silicon oxide structure of the present invention and natural graphite as a carbonaceous material were mixed in predetermined proportions, as shown in Table 4 and FIG. 7, significant improvement in the battery capacity was observed, and a capacity retention rate of the 100th cycle was maintained at a level that was sufficient for practical use.

In addition, it was confirmed that, in Comparative Examples 1 and 2, the value of the rated capacity retention rate (2 C/0.2 C) was low as 86% and 78%, but in Examples 1 to 3, all of values of the rated capacity retention rate exceeded 90%, and when the silicon nanoparticle-containing hydrogen polysilsesquioxane sintered product and natural graphite were mixed in predetermined proportions, a significant rate characteristic improvement effect was exhibited (Table 4 and FIG. 9).

In addition, in Examples 4 and 5 in which a titanium oxide-composited/coated silicon nanoparticle-containing hydrogen polysilsesquioxane sintered product and natural graphite were mixed in predetermined proportions, as shown in Table 5 and FIG. 8, significant improvement in the battery capacity was observed, and a capacity retention rate of the 100th cycle was maintained at a level that is sufficiently enough for a practical use.

In addition, in Examples 4 and 5, it was confirmed that all values of the rated capacity retention rate were 90% or more, and when the titanium oxide silicon nanoparticle-containing hydrogen polysilsesquioxane sintered product and natural graphite were mixed in predetermined proportions, a rate characteristic improvement effect was exhibited (Table 5 and FIG. 10).

Therefore, it was verified that, according to the configuration of the present invention in which a carbonaceous material and a predetermined silicon oxide structure were mixed at a specific ratio, it was possible to secure favorable various battery characteristics in a balanced manner, and also it was possible to further improve at least one characteristic of a battery capacity and a rate characteristic.

The present invention can be applied as a negative electrode material of a secondary battery, a negative electrode, and a secondary battery. Therefore, the present invention has high industrial applicability in the field of chemistry in which a negative electrode material is produced, in the electrical and electronics field such as secondary batteries and various electronic devices, and in the field of vehicles such as hybrid vehicles.

What is claimed is:

1. A composition for a secondary battery negative electrode comprising:
    a carbonaceous material (a); and
    a silicon oxide structure (b),
    wherein the silicon oxide structure (b) comprises a silicon oxide framework containing Si and O in its atomic composition and silicon-based nanoparticles that are chemically bonded to the silicon oxide framework as components, wherein the silicon oxide structure (b) is contained in a proportion of 15 mass % or more with respect to a total amount of the carbonaceous material (a) and the silicon oxide structure (b), and wherein the silicon oxide structure (b) satisfies the following conditions (i) to (iii):

(i) having an atomic composition represented by a general formula $SiO_{x2}H_{y2}$, wherein $0.3<x2<1.5$, $0.01<y2<0.35$;

(ii) having Si—H bonds; and (iii) being essentially free of carbon.

2. The composition for a secondary battery negative electrode according to claim 1, wherein the silicon oxide structure (b) is contained in a proportion of 18 to 90 mass % with respect to the total amount of the carbonaceous material (a) and the silicon oxide structure (b).

3. The composition for a secondary battery negative electrode according to claim 1, wherein the silicon oxide structure (b) is contained in a proportion of 18 to 85 mass % with respect to the total amount of the carbonaceous material (a) and the silicon oxide structure (b).

4. The composition for a secondary battery negative electrode according to claim 1, wherein the silicon oxide structure (b) comprises secondary aggregates in which the silicon-based nanoparticles are aggregated as primary particles.

5. The composition for a secondary battery negative electrode according to claim 1, wherein the silicon oxide structure (b) additionally satisfies the following condition (iv):

(iv) in a spectrum obtained through infrared spectroscopy measurement, having a ratio $(I_1/I_2)$ between an intensity $(I_1)$ of a peak 1 derived from Si—H bonds at 820 to 920 $cm^{-1}$ and an intensity $(I_2)$ of a peak 2 derived from Si—O—Si bonds at 1,000 to 1200 $cm^{-1}$ that is in a range of 0.01 to 0.35.

6. The composition for a secondary battery negative electrode according to claim 1, wherein the silicon oxide structure (b) additionally satisfies the following condition (v):

(v) in a spectrum obtained through infrared spectroscopy measurement, among peaks derived from Si—O—Si bonds, having a ratio $(I_{2-1}/I_{2-2})$ between an intensity $(I_{2-1})$ of a peak 2-1 closest to 1,170 $cm^{-1}$ and an intensity $(I_{2-2})$ of a peak 2-2 closest to 1,070 $cm^{-1}$ that exceeds 1.

7. The composition for a secondary battery negative electrode according to claim 1, wherein at least some of the silicon-based nanoparticles are bonded to the silicon oxide framework through Si—O—Si bonds.

8. The composition for a secondary battery negative electrode according to claim 1, wherein a metal oxide containing at least one selected from among titanium, zinc, zirconium, aluminum, and iron is additionally contained as a constituent element, and the silicon oxide structure (b) is coated with the metal oxide or composited with the metal oxide.

9. The composition for a secondary battery negative electrode according to claim 8, wherein the metal oxide contains titanium as the constituent element.

10. The composition for a secondary battery negative electrode according to claim 1, wherein a volume-based average particle diameter of the silicon-based nanoparticles is 100 nm to 500 nm.

11. The composition for a secondary battery negative electrode according to claim 1, wherein the silicon-based nanoparticles are contained in a proportion of 5 to 65 mass % with respect to a total mass of the silicon oxide structure (b).

12. The composition for a secondary battery negative electrode according to claim 1, wherein the carbonaceous material (a) is a powder including substantially spherical particles and with a volume-based average particle diameter of 1 to 100 µm.

13. The composition for a secondary battery negative electrode according to claim 1, wherein the carbonaceous material (a) is graphite.

14. A negative electrode for a secondary battery comprising the composition for a secondary battery negative electrode according to claim 1.

15. A secondary battery comprising the negative electrode for a secondary battery according to claim 14.

16. The secondary battery according to claim 15, wherein the secondary battery is a lithium ion secondary battery.

17. The composition for a secondary battery negative electrode according to claim 2, wherein the silicon oxide structure (b) is contained in a proportion of 18 to 85 mass % with respect to the total amount of the carbonaceous material (a) and the silicon oxide structure (b).

18. The composition for a secondary battery negative electrode according to claim 2, wherein the silicon oxide structure (b) comprises secondary aggregates in which the silicon-based nanoparticles are aggregated as primary particles.

19. The composition for a secondary battery negative electrode according to claim 3, wherein the silicon oxide structure (b) comprises secondary aggregates in which the silicon-based nanoparticles are aggregated as primary particles.

20. The composition for a secondary battery negative electrode according to claim 2, wherein the silicon oxide structure (b) additionally satisfies the following condition (iv):

(iv) in a spectrum obtained through infrared spectroscopy measurement, having a ratio $(I_1/I_2)$ between an intensity $(I_1)$ of a peak 1 derived from Si—H bonds at 820 to 920 $cm^{-1}$ and an intensity $(I_2)$ of a peak 2 derived from Si—O—Si bonds at 1,000 to 1200 $cm^{-1}$ that is in a range of 0.01 to 0.35.

* * * * *